United States Patent [19]
Fujimura et al.

[11] Patent Number: 5,482,224
[45] Date of Patent: Jan. 9, 1996

[54] SEAT BELT RETRACTOR

[75] Inventors: Yoshiichi Fujimura, Shiga, Japan; Henry Hanna, Craigavon, Northern Ireland

[73] Assignee: Takata Corporation, Tokyo, Japan

[21] Appl. No.: 325,169

[22] Filed: Oct. 20, 1994

[30] Foreign Application Priority Data

Nov. 24, 1993 [JP] Japan .................... 5-293481

[51] Int. Cl.⁶ .................................. B60R 22/405
[52] U.S. Cl. .................... 242/376; 242/383.2; 242/384.5
[58] Field of Search ................ 242/376, 376.1, 242/379, 382.6, 383.2, 384.2, 384.5, 384.6; 280/806; 297/478

[56] References Cited

U.S. PATENT DOCUMENTS

| | | | |
|---|---|---|---|
| 4,366,934 | 1/1983 | Seifert et al. | 242/376.1 |
| 4,509,707 | 4/1985 | Ernst et al. | 242/376.1 |
| 4,549,705 | 10/1985 | Fohl | 242/376.1 |
| 4,619,419 | 10/1986 | Essler | 242/379.1 X |
| 4,844,375 | 7/1989 | Ballet | 242/376.1 |

Primary Examiner—John M. Jillions
Attorney, Agent, or Firm—kanesaka & Takeuchi

[57] ABSTRACT

In a seat belt retractor according to the present invention, an arcuate fall preventing flange 4m is provided on an outer surface of a guide flange 4b of the reel shaft. The central axis $a_2$ of the reel shaft 4 is eccentrically shifted from the central axis $a_1$ of the through-hole 2d of the right-hand side wall 2a by an eccentric amount "b" and the reel shaft is faced to the through-hole 2d to coincide the peripheral edge of the profile consisting of the left-hand guide flange 4c and the fall preventing flange 4r with the through-hole 2d. In this state, the reel shaft is passed through the through-hole 2d. After that, the reel shaft is moved upward to align the central axis $a_2$ of the reel shaft 4 with the central axis $a_1$ of the through-hole 2d of the right-hand side wall 2a. Thereby, the reel shaft 4 is assembled in the predetermined position of the frame. In this state, the fall preventing projection 4m is positioned so that the fall preventing flange 4m abuts on the teeth 2f to prevent the reel shaft from coming off.

5 Claims, 19 Drawing Sheets

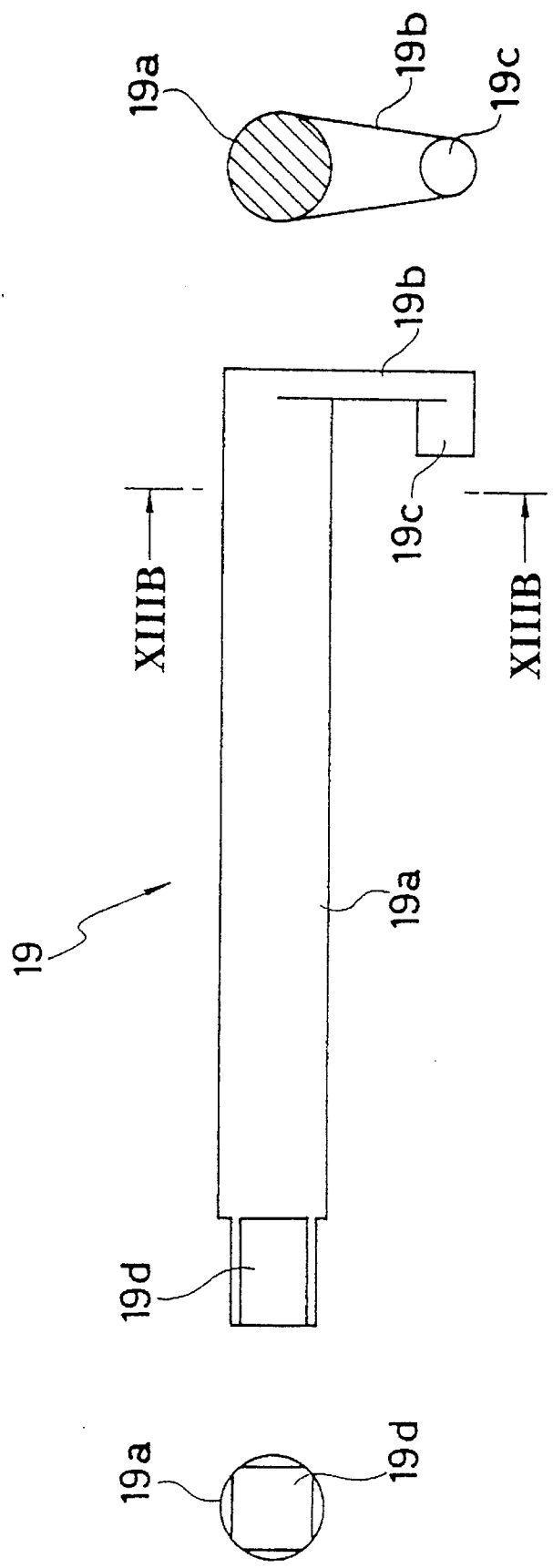

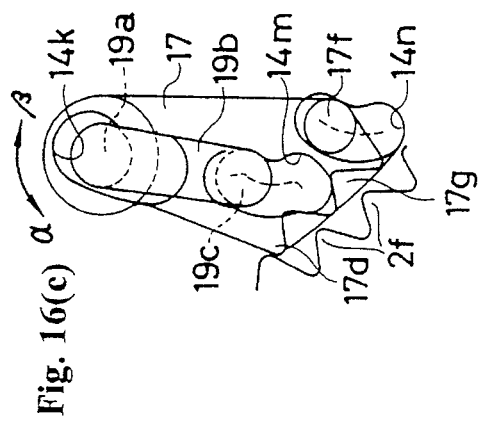
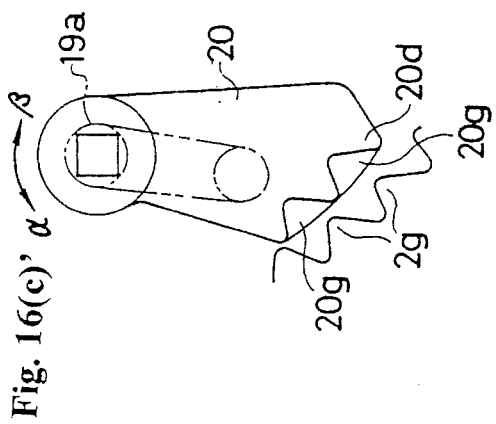
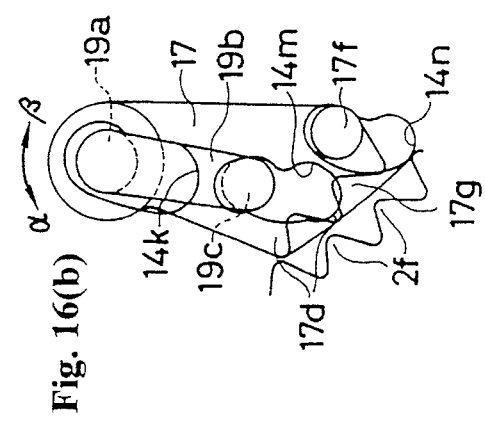
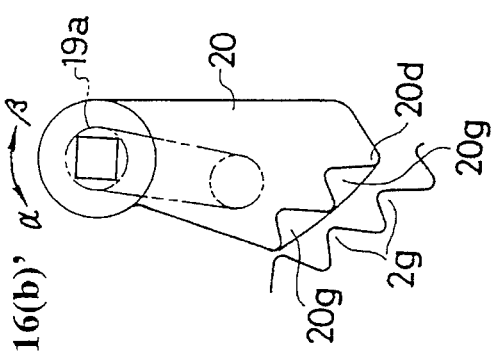
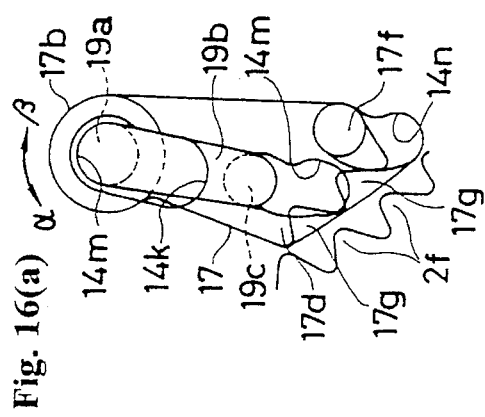
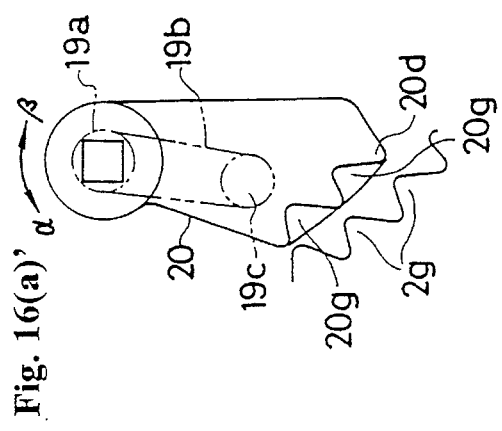

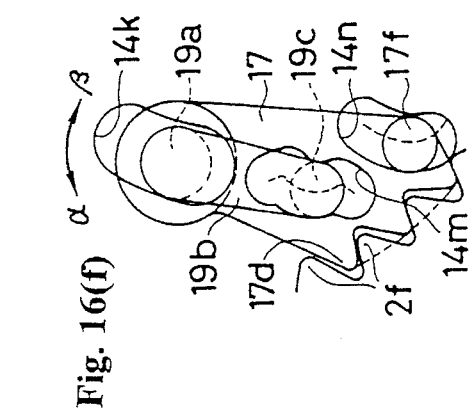
Fig. 16(d)
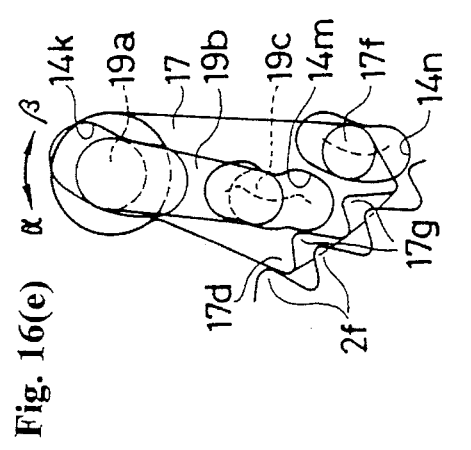
Fig. 16(e)
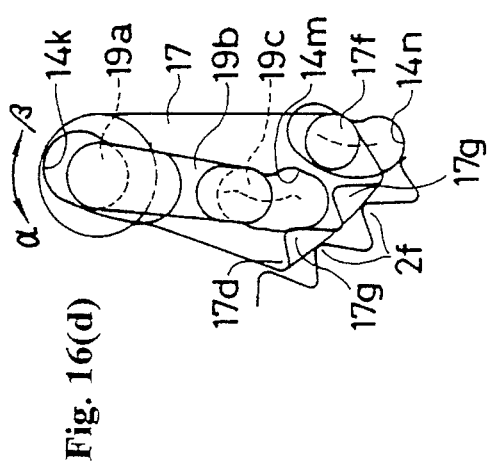
Fig. 16(f)
Fig. 16(d)'
Fig. 16(e)'
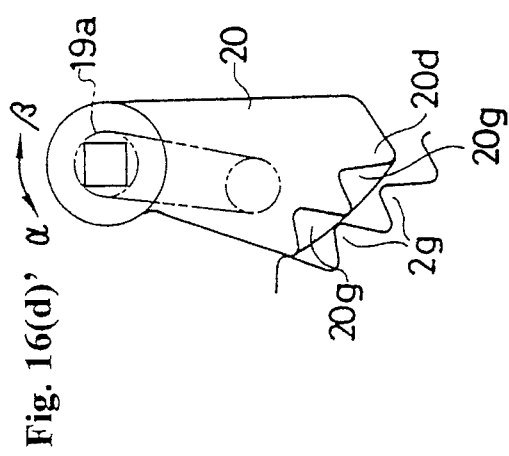
Fig. 16(f)'

FIG.20
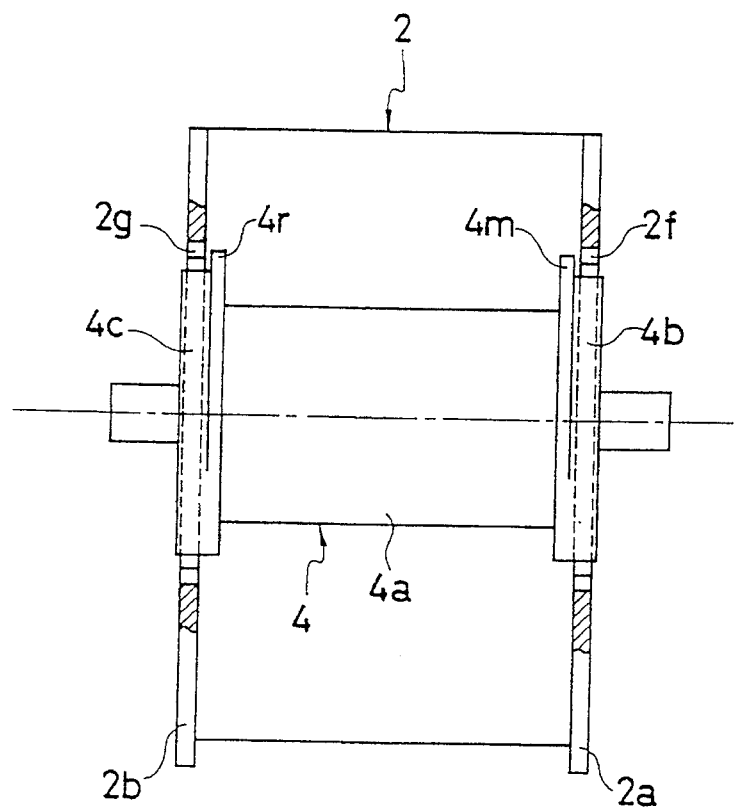
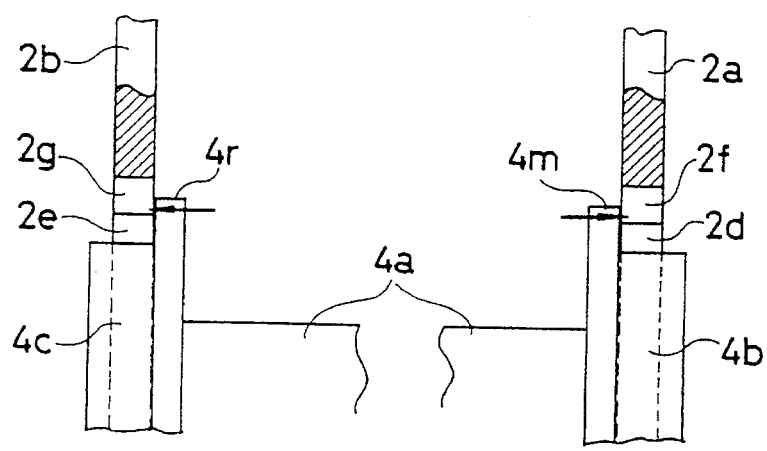
Fig. 21(b)  Fig. 21(a)

SEAT BELT RETRACTOR

BACKGROUND OF THE INVENTION

The present invention relates to a seat belt device that is mounted on a vehicle, such as an automobile, for the purpose of protecting an occupant. More particularly, the present invention relates to a seat belt retractor locking the reel shaft from rotating to prevent the webbing from being pulled out when an emergency situation occurs.

As disclosed in the specification and drawings of U.S. Pat. No. 4,796,918, a typical conventional seat belt retractor mounted on a vehicle such as an automobile has a reel shaft for winding up a webbing, a frame for rotatably supporting both ends of the reel shaft, locking means disposed between the frame and the reel shaft for allowing the reel shaft to rotate normally and for preventing the reel shaft from rotating at least in a webbing unwinding direction at a time when it is necessary to prevent the reel shaft from rotating, deceleration sensing means which works when deceleration exceeding a predetermined value acts on the vehicle, and activating locking means for activating the locking means in accordance with the working of the deceleration sensing means.

In the seat belt retractor as mentioned above, since the reel shaft is usually free to rotate, the webbing is freely pulled out and the occupant can move forward. When an emergency situation occurs, for example, when a large degree of deceleration acts on the vehicle, since the deceleration sensing means senses the deceleration and operates, the locking means operates by the activating locking means. Since the operation of the locking means locks the reel shaft from rotating, the webbing is prevented from being pulled out so that the occupant is restrained by the webbing to prevent the inertial forward movement of the occupant.

In a typical conventional seat belt retractor as mentioned above, as shown in FIG. 22, a frame 102 for rotatably supporting both ends of a reel shaft 101 is formed in a U-shape by a press working and through-holes 102c and 102d are provided in a right-hand side wall 102a and a left-hand side wall 102b of the frame 102, respectively, so that the reel shaft 101 passes through the through-holes 102c and 102d. In this case, a webbing winding portion 101a of the reel shaft 101 is positioned between the right-hand side wall 102a and the left-hand side wall 102b. A right end 101b and a left end 101c of the reel shaft 101 pass through the through-holes 102c and 102d to protrude outside the right-hand and left-hand side walls, respectively.

Webbing flanges 101d, 101e are provided for winding or unwinding the webbing to the webbing winding portion 101a of the reel shaft 101 smoothly. Circular flanges 101f and 101g each having a diameter larger than the diameter of the through-holes 102c and 102d are provided to the inner surfaces of the webbing flanges 101d and 101g to prevent the reel shaft 101 from coming off the right-hand and left-hand side walls 102a and 102b.

However, as the circular flanges 101f, 101g as mentioned above are provided, the webbing winding portion 101a of the reel shaft 101 cannot pass through the through-holes 102c and 102d of the right-hand and left-hand side walls 102a and 102b of the frame 102 formed in the U-shape when inserting the reel shaft 101 into the frame 102 to dispose the webbing winding portion 101a between the right-hand side wall 102a and the left-hand side wall 102b. Therefore, as shown in FIG. 23, conventionally, the right-hand and left-hand side walls of the frame 102 are previously processed by bending to be in a shape that the distance between the right-hand and left-hand side walls becomes larger toward their ends. After the webbing winding portion 101a is disposed between the right-hand and left-hand side walls 102a and 102b and the right and left circular flanges 101f and 101g are disposed facing to the through holes 102c and 102d, the right-hand and left-hand side walls of the frame 102 are then processed by bending to be in the U-shape so that the reel shaft is assembled into the frame 102.

However, according to the conventional way of assembling the reel shaft 101 into the frame 102 as mentioned above, the reel shaft 101 must be retained in a predetermined position of the frame previously bent in the shape that the distance between the right-hand and left-hand side walls becomes larger toward their ends, and then the right-hand and left-hand side walls must be further bent in the U-shape by a press working. Therefore, it consumes not only plenty of labor but also many steps.

SUMMARY OF THE INVENTION

It is an object of the present invention to provide a seat belt retractor wherein a reel shaft is easily assembled into a frame and a webbing winding portion of the reel shaft is prevented from coming off a position between the right-hand and left-hand side walls of the frame.

For accomplishing the above mentioned object, the present invention provides a seat belt retractor comprising a reel shaft having a webbing winding portion, and a frame having right-hand and left-hand side walls each of which has a through-hole for the reel shaft, the webbing winding portion of the reel shaft being positioned inside the right-hand and left-hand side walls, wherein the webbing winding portion has a projection protruding in the radial direction at least on one of the right and left sides thereof, the maximum dimension of a profile formed with the projections and the webbing winding portion is smaller than the diameter of the adjacent through-hole in each wall and is set so that the projection projects from the inside periphery of the adjacent through-hole when the center of the through-hole is aligned with the central axis of the reel shaft.

Further, according to the present invention, the projections are formed on both of the right and left sides of the webbing winding portion.

Furthermore, according to the present invention, the projection comprises an arcuate flange.

In addition, according to the present invention, the arcuate flange is divided into a predetermined number.

Furthermore, the seat belt retractor further comprises locking means disposed between the frame and the reel shaft for allowing the reel shaft to rotate normally and for preventing the reel shaft from rotating at least in a webbing unwinding direction at a time when it is necessary to prevent the reel shaft from rotating, teeth formed on the inside peripheries of the through holes, and stopper members formed on flanges provided on the right and left sides of the webbing winding portion, the stopper member being rotatably disposed between an engaging position where it engages with the teeth and a non-engaging position where it is apart from the teeth, the projection being disposed opposite to a portion where the stopping member engages with the teeth with respect to the center of the reel shaft.

In the seat belt retractor structured as described above, for assembling the reel shaft into the frame, the central axis of the reel shaft is eccentrically shifted from the central axis of the through-hole of the right-hand and left-hand side walls to coincide the profile formed with the projection and the webbing winding portion with the through-hole facing to it.

In this state, one of the through-holes is pierced with the reel shaft to position the webbing winding portion between the right-hand and left-hand side walls. In this case, since the maximum dimension of the profile formed with the projection and the webbing winding portion is set to be smaller than the diameter of the through-hole, the reel shaft is easy to pierce the through-hole. After that, in a state in which the webbing winding portion is positioned between the right-hand and left-hand side walls, the reel shaft is moved to align the central axis thereof with the center of the through-hole so that the reel shaft is assembled into a predetermined position relative to the frame.

In a state in which the reel shaft is assembled into the predetermined position relative to the frame, each projection projects from the inside periphery of the through-hole, therefore, even if the reel shaft is about to come off the right-hand and left-hand side wall of the frame, the projection abuts on any one of the inner surfaces of the right-hand and left-hand side walls so that the reel shaft can not come off the right-hand side wall or the left-hand wall.

In the seat belt retractor structured as described above, since the frame may be formed in the U-shape from the beginning, the after-processing such that the right-hand and left-hand side walls are bent to make the distance between them larger toward their ends as the prior art is not required. Therefore, it is possible to reduce the assembly steps.

In addition, the seat belt retractor is easily assembled without time and labor, only by aligning the central axis of the reel shaft with the center of the through-holes so that the reel shaft is assembled into the frame. Therefore, it is possible to reduce the assembly steps.

Furthermore, according to the present invention, when the stopping members engage the teeth formed on the inside periphery of the through-holes, the reaction force acts to the reel shaft through the stopping members so that the outer surfaces of the right-hand and left-hand flanges abut on the teeth of the inside periphery of the through-holes, respectively. As the result of this, the reaction force is supported by the frame. In this state, since the projections are positioned at the outer sides of the right-hand and left-hand flanges which abut on the teeth of the inside periphery of the through-holes, even if the reel shaft is about to come off the right-hand or left-hand side wall by the reaction forces acting eccentrically to the reel shaft, the reel shaft is securely prevented from coming off the frame by the projections.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 13($a$) is a front view of the joint pin, FIG. 13($b$) is a sectional view taken along the line XIIIB—XIIIB in FIG. 13($a$), and FIG. 13($c$) is a side view of the joint pin as seen from the left side thereof;

FIG. 20 is a view for explaining the remains of the procedure of assembling the reel shaft into the frame in the embodiment;

FIG. 21($a$) and 21($b$) are views for explaining how to prevent the reel shaft from coming off in the embodiment;

DESCRIPTION OF THE PREFERRED EMBODIMENTS

Figure 1A:
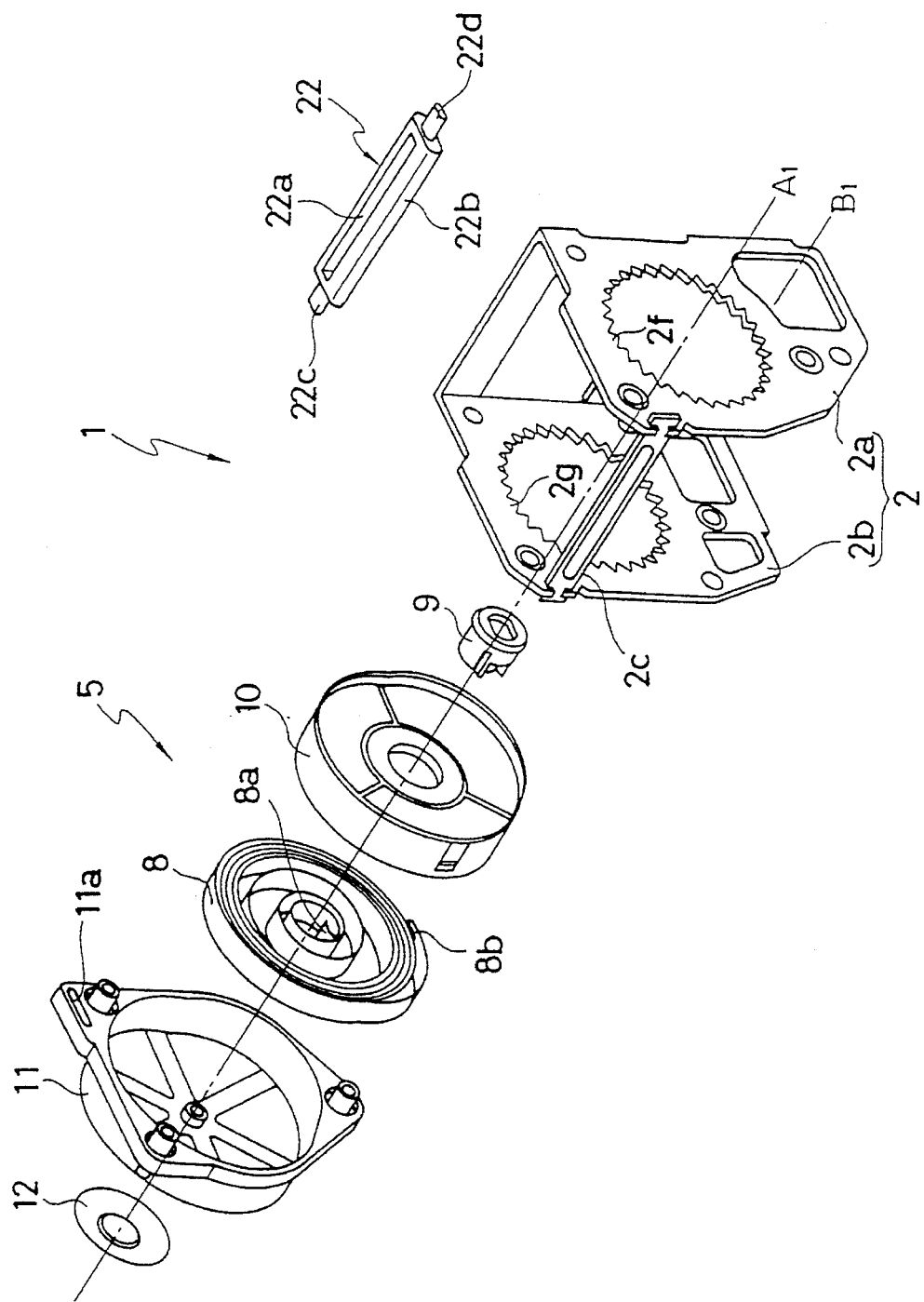
FIG. 1A is an exploded perspective view of a left-hand portion of one embodiment of a seat belt retractor according to the present invention.
Figure 1B:
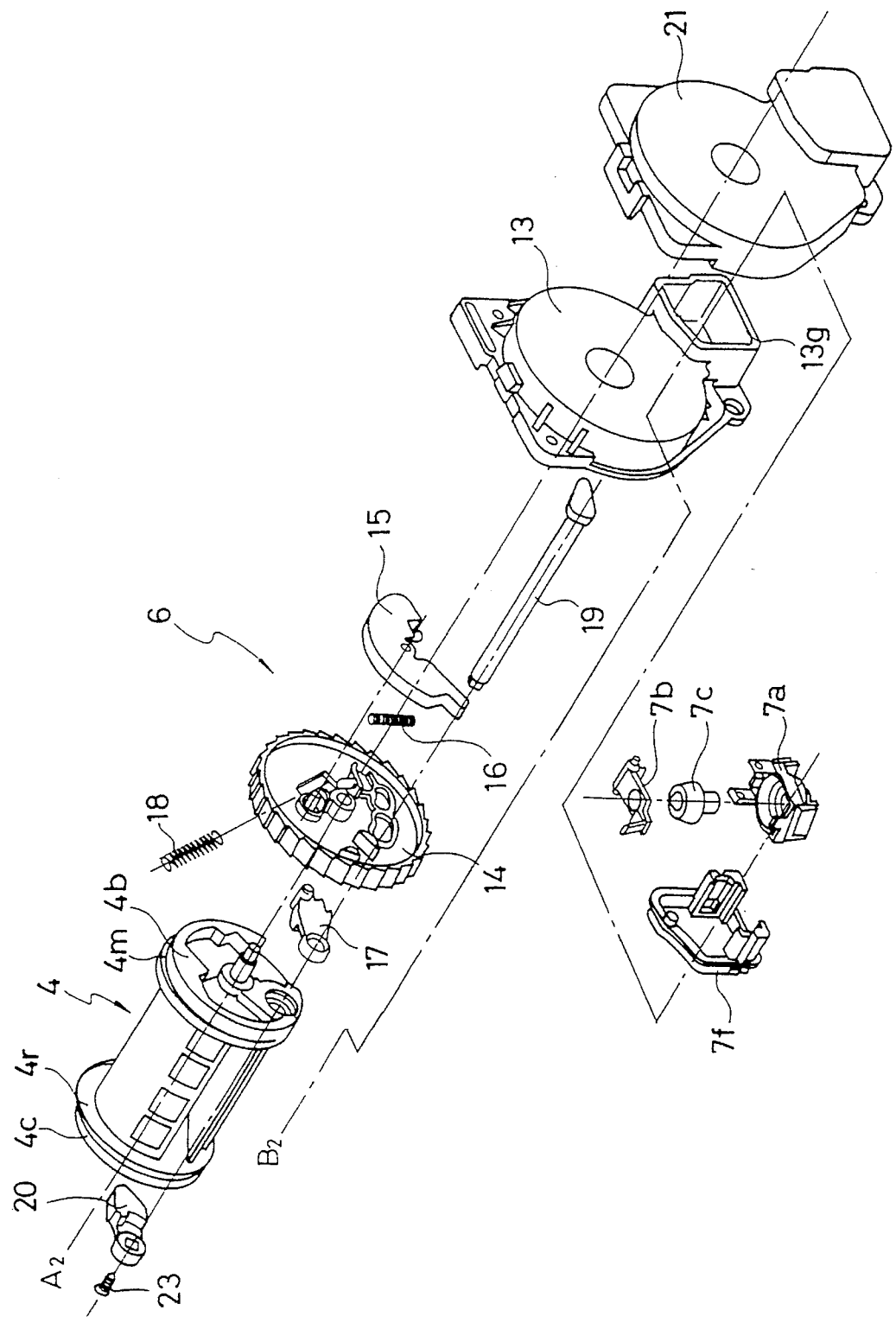
FIG. 1B is an exploded perspective view of a right-hand portion of the embodiment shown in FIG. 1A.
Figure 2:
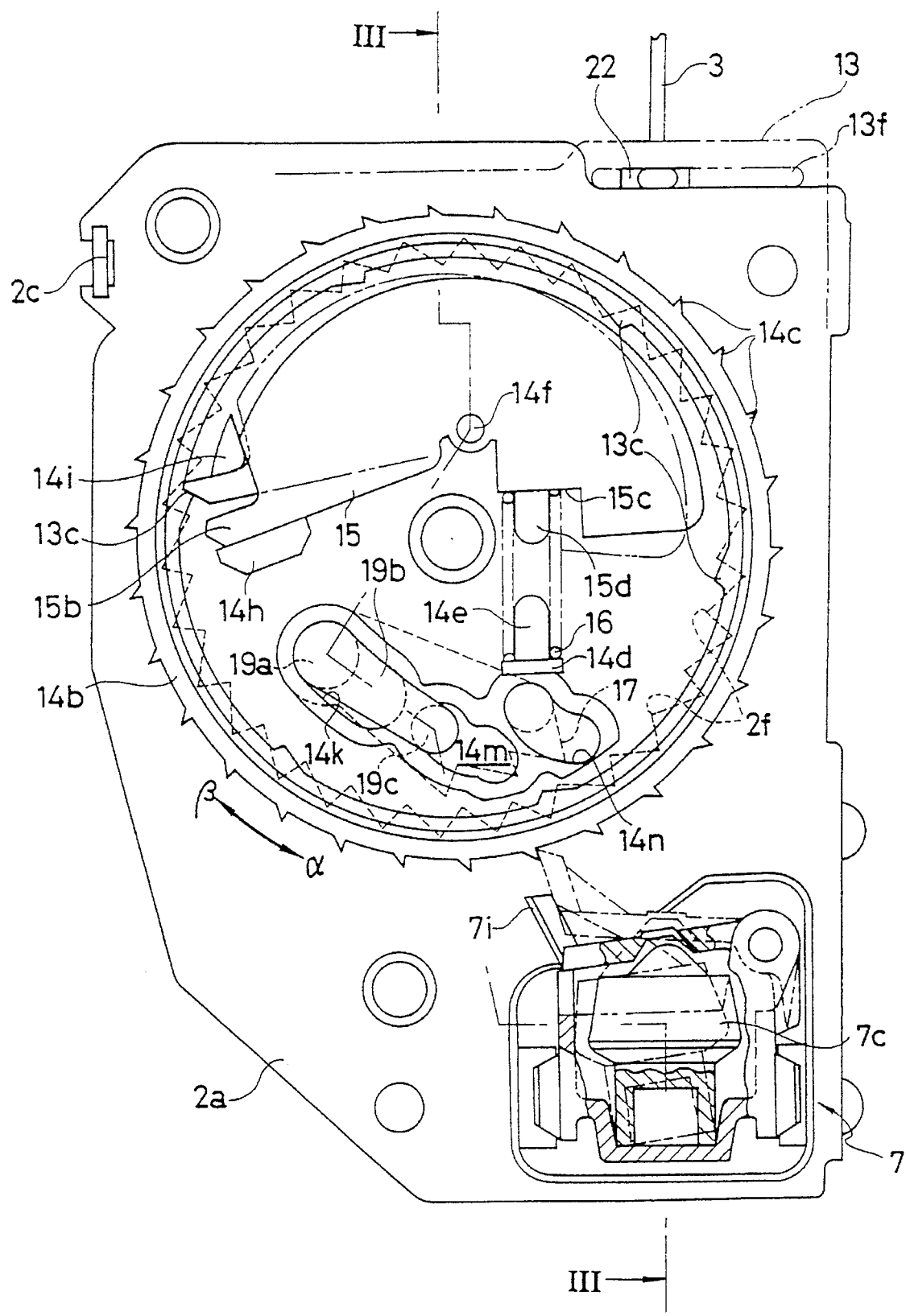
FIG. 2 is a side view of the seat belt retractor of the embodiment in its assembled state, as seen from the right-hand side thereof, with a cover removed therefrom.
Figure 3:
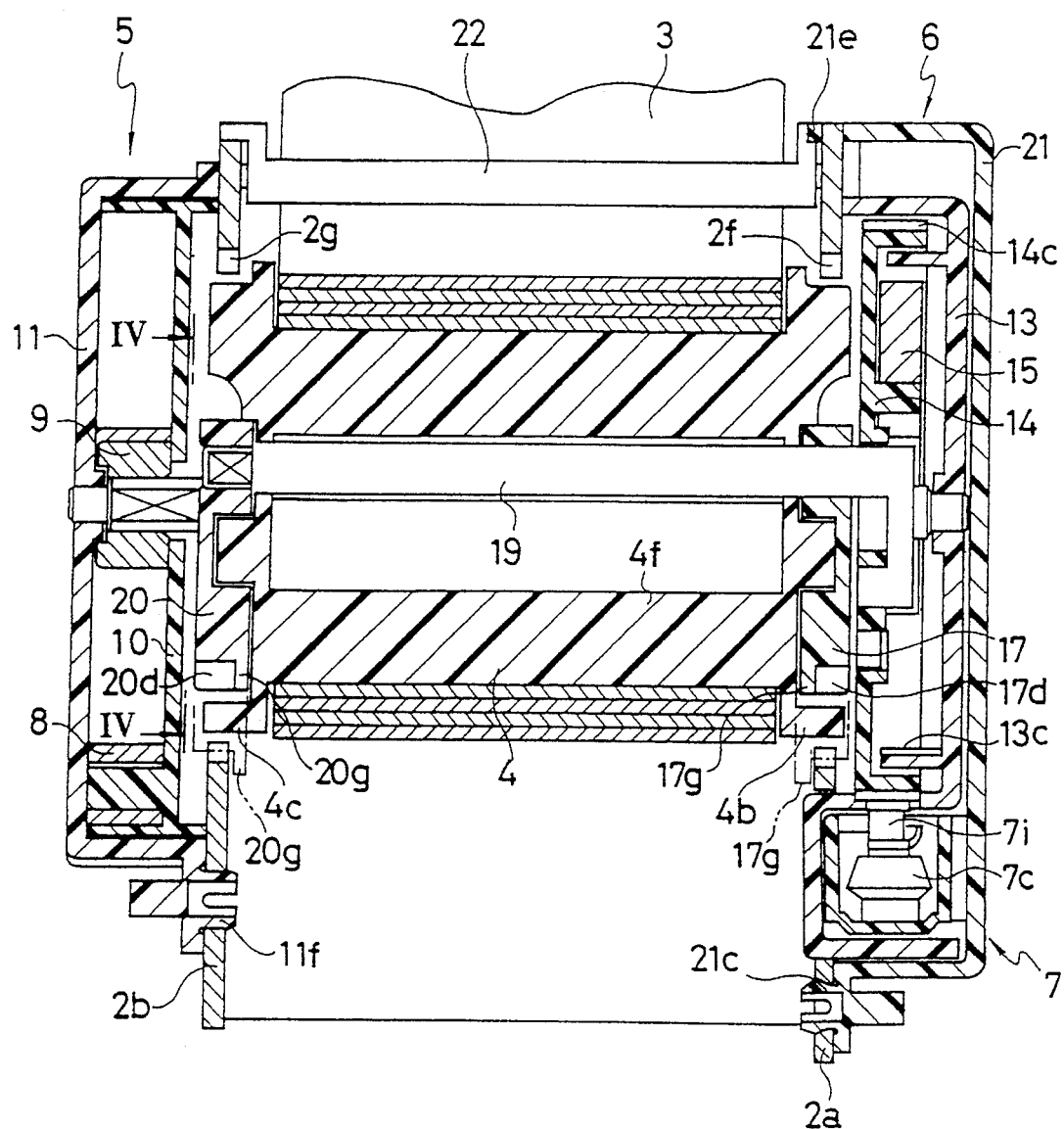
FIG. 3 is a sectional view taken along the line III—III in FIG. 2, showing the assembled state of the seat belt retractor of the embodiment.
Figure 4:
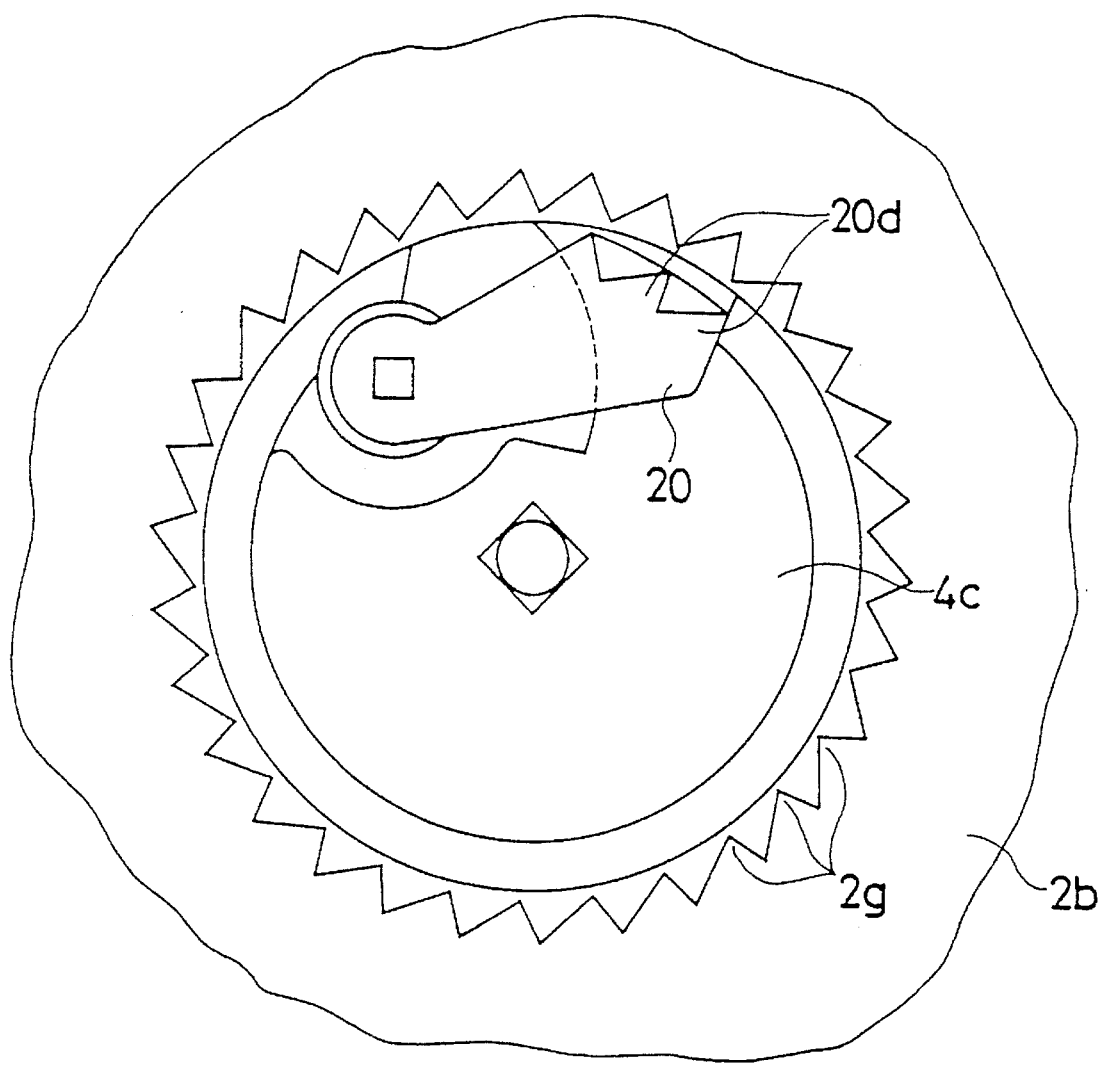
FIG. 4 is a fragmentary sectional view taken along the line IV—IV in FIG. 3, showing the assembled state of the seat belt retractor of the embodiment.

FIGS. 1A and 1B are an exploded perspective views of one embodiment of a seat belt retractor according to the present invention wherein, FIG. 1A shows a left-hand portion thereof, and FIG. 1B shows a right-hand portion thereof. The whole exploded perspective view of the embodiment is structured by aligning the lines $A_1$ and $B_1$ of FIG. 1A with the lines $A_2$ and $B_2$ of FIG. 1B, respectively. FIGS. 2–4 show the seat belt retractor of the embodiment in its assembled state, wherein FIG. 2 is a partially sectional side view of the seat belt retractor as seen from the right-hand side thereof, with a cover removed therefrom, FIG. 3 is a sectional view taken along the line III—III in FIG. 2, and FIG. 4 is a sectional view taken along the line IV—IV in FIG. 3.

Figure 6:
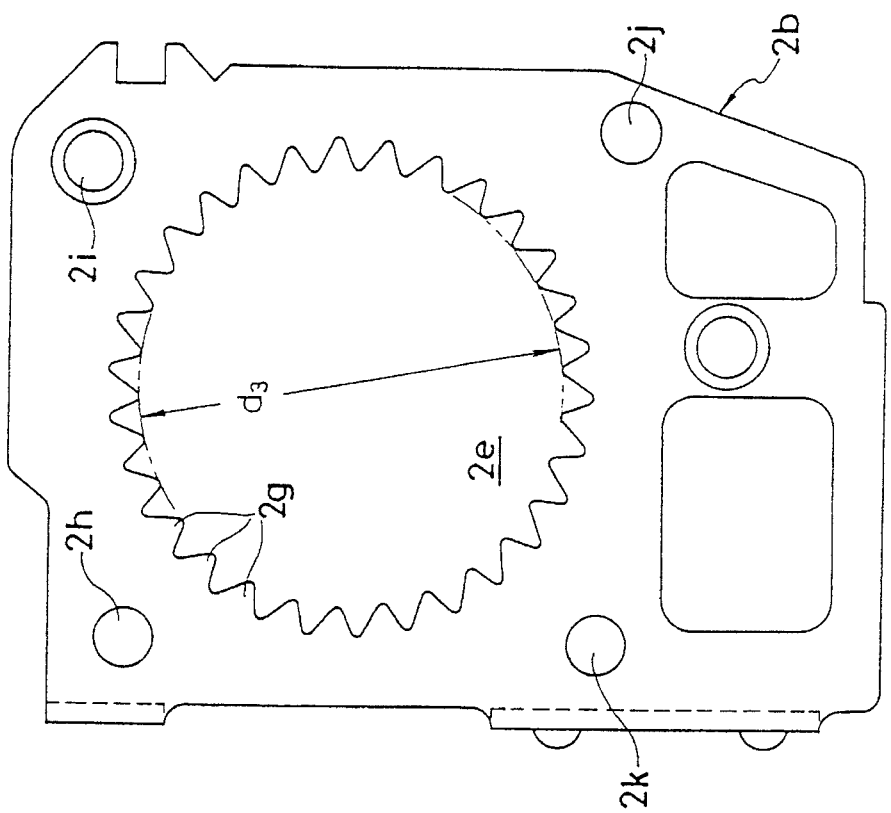
FIG. 6 is a side view of the frame employed in the embodiment, as seem from the left-hand side thereof.
Figure 5:
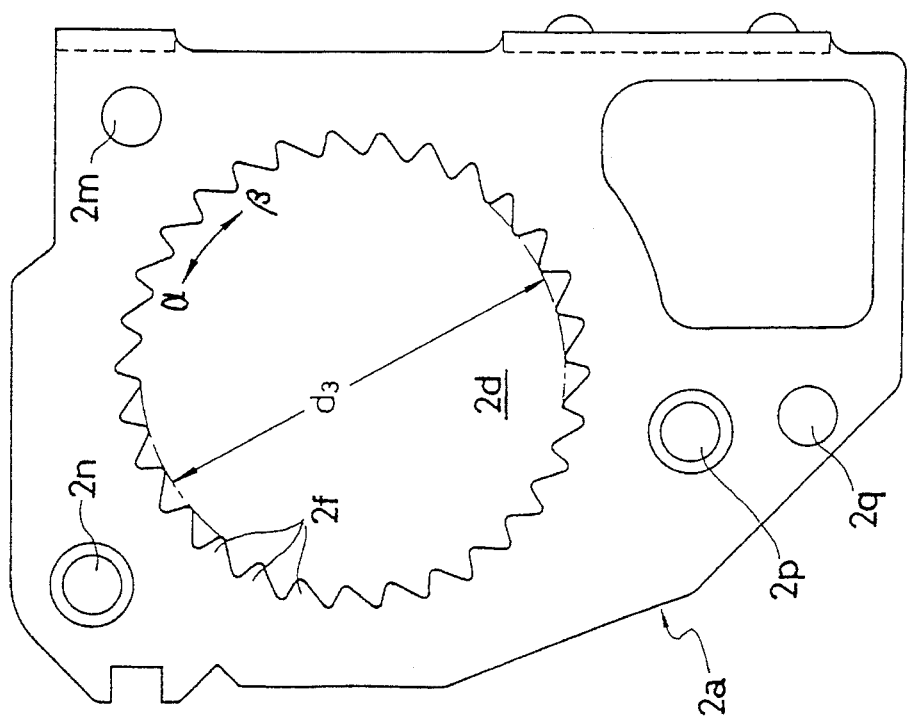
FIG. 5 is a side view of a frame employed in the embodiment, as seen from the right-hand side thereof.

As shown in FIGS. 1A to 4, the seat belt retractor 1 in this embodiment includes a U-shaped frame 2 having a pair of right-hand and left-hand side walls 2a and 2b. The right-hand and left-hand side walls 2a and 2b are connected together through a connecting member 2c, so that the frame 2 is reinforced. The right-hand side wall 2a is formed with a circular hole 2d, as shown in FIG. 5. Similarly, the left-hand side wall 2b is formed with a circular hole 2e, as shown in FIG. 6. In addition, the inner peripheral surfaces of the hole 2d and 2e in the right-hand and left hand side walls 2a and 2b are formed with a predetermined number (thirty in the figure) of sawtooth-shaped teeth 2f . . . and 2g . . . over the entire circumferences thereof, respectively. The teeth 2f and 2g have the same triangular cross-sectional configurations. The surface of each tooth that faces the webbing unwinding direction α has a relatively steep slope, whereas the surface of the tooth that faces a webbing winding direction β has a relatively gentle slope. The phase of the left-hand teeth 2g is advanced for a predetermined angle (e.g., 3°) in a webbing unwinding direction α relative to the phase of the right-hand teeth 2f.

In addition, the left-hand side wall 2b is provided with four fixing holes 2h, 2i, 2j, and 2k and right-hand side wall 2a is provided with four fixing holes 2m, 2n, 2p, and 2q.

Figure 7:
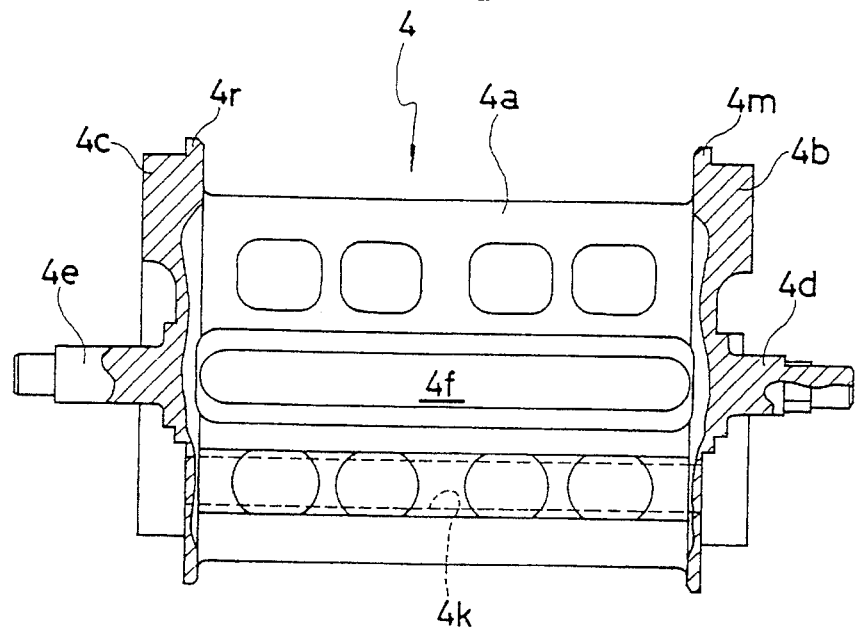
FIG. 7 is a front view of a reel shaft employed in the embodiment.

As shown in FIG. 3, a reel shaft 4 for winding up a webbing 3 is disposed between the right-hand and left-hand side walls 2a and 2b of the frame 2. Referring to FIG. 7, the reel shaft 4 comprises a central webbing winding portion 4a, circular guide flanges 4b and 4c, which are formed at the right and left ends, respectively, of the webbing winding portion 4a so as to guide the webbing 3 when it is wound up and off, a first rotating shaft 4d which is provided in the center of the guide flange 4b so as to project axially outwardly, and a second rotating shaft 4e which is provided in the center of the guide flange 4c in concentrical relation to the first rotating shaft 4d. The first rotating shaft 4d and the second rotating shaft 4e rotating coaxially with the first rotating shaft 4d are positioned along a central axis of the webbing winding portion 4a.

The webbing winding portion 4a is provided with a diametrical through-hole 4f into which one end of the webbing 3 is inserted and retained so that the webbing 3 can be wound up.

Figures 8A, 8B:
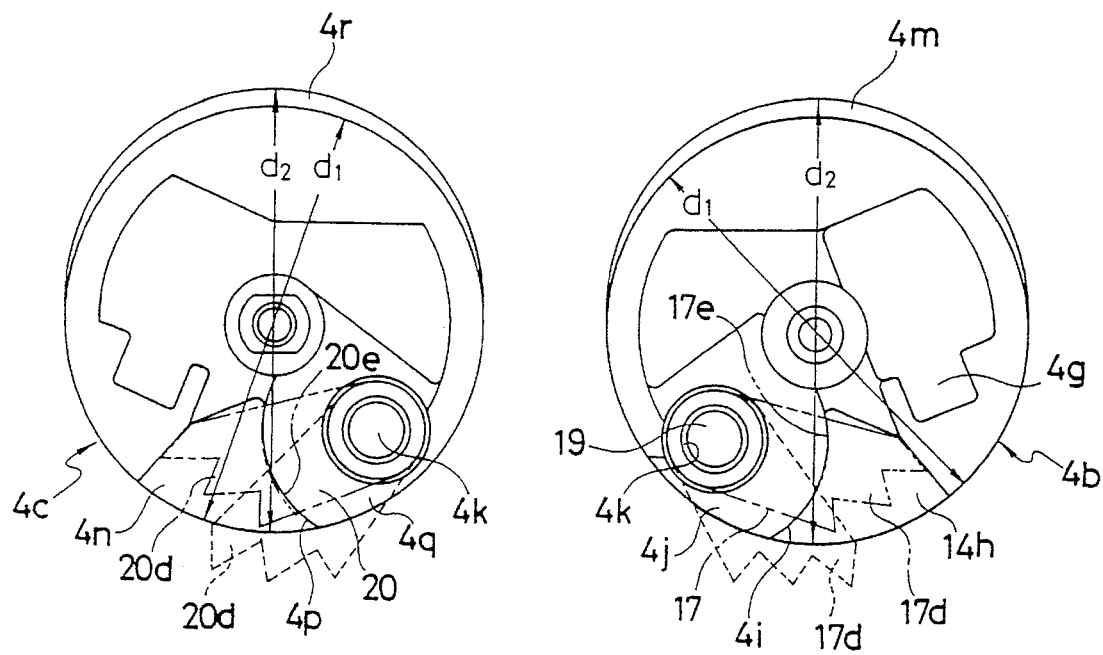
FIG. 8($a$) is a side view of the reel shaft as seem from the right-hand side thereof and FIG. 8($b$) is a side view of the reel shaft as seen from the left-hand thereof.

As shown in FIG. 8(a), the right-hand guide flange 4b is formed in a circular shape having a diameter $d_1$ and is provided with a first recess 4g for accommodating a pawl spring 18 (shown in FIG. 1B), a second recess 4h in which is disposed a pawl portion 17c of a main pawl 17 (shown specifically in FIG. 12, described later), a load bearing portion 4j that is formed with a load bearing surface 4i for receiving a load applied to the pawl portion 17c of the main pawl 17, and an axial through-hole 4k in which a joint pin 19 (shown specifically in FIG. 13, described later) is rotatably fitted. The load bearing surface 4i is formed in a circular-arc shape which has a predetermined length and is in concentrical relation with the through-hole 4k.

In addition, the guide flange 4b is provided with an arcuate fall preventing flange 4m, which is disposed on the outer peripheral surface thereof, for preventing the reel shaft from coming off the hole 2d of the right-hand side wall 2a when the webbing winding portion 4a of the reel shaft 4 is disposed at a predetermined position between the right-hand side wall 2a and the left-hand side wall 2b. The fall preventing flange 4m is set to have the nearly same diameter as the outer diameter of the guide flange 4b and is eccentrically disposed to project for a predetermined amount from the periphery of the guide flange 4b roughly opposite to the through-hole 4k. The dimension d2 which is the maximum dimension of the periphery formed with the guide flange 4b and the fall preventing flange 4m is smaller a little than the inner diameter d3 (as shown in FIGS. 5 and 6) of the distal ends of the teeth 2f and 2g formed on the inside periphery of the holes 2d and 2e of the right-hand and left-hand side walls 2a and 2b. That is, the guide flange 4b including the fall preventing flange 4m can be passed through the through holes 2d and 2e. Furthermore, as shown in FIG. 20 described later, in a state that the a central axis $a_2$ of the reel shaft 4 is aligned with a central axis $a_1$ of the through-holes 2d and 2e of the right-hand and left-hand side walls 2a and 2b, the maximum dimensional portion of the fall preventing flange 4m at least in the radial direction is set to have a dimension to project from the inside periphery of the through-holes 2d and 2e, that is, to position one part thereof inside the right-hand and left-hand side walls.

In addition, as shown in FIG. 8(b), the left-hand guide flange 4c is provided with a third recess 4n in which a pawl portion 20c of a backup pawl 20 (shown specifically in FIG. 14, described later) is disposed, a load bearing portion 4q formed with a load bearing surface 4p for receiving a load applied to the pawl portion 20c of the backup pawl 20, an axial through-hole 4k in which the joint pin 19 is rotatably fitted. The load bearing surface 4p is formed in a circular-arc shape which has a predetermined length and is in concentrical relation with the through-hole 4k.

In addition, the guide flange 4c is provided with a fall preventing flange 4r, which is disposed on the outer peripheral surface thereof, for preventing the reel shaft 4 from coming off the hole 2e of the left-hand side wall 2b when the webbing winding portion 4a of the reel shaft 4 is disposed at the predetermined position between the right-hand side wall 2a and the left-hand side wall 2b. The fall preventing flange 4r is formed to be the same size as the size of the fall preventing flange 4m.

As apparent from FIG. 7, the through-hole 4k extends not only through the guide flanges 4b and 4c but also through the central webbing winding portion 4a axially. In other words, the through-hole 4k extends axially through the reel shaft 4.

As shown in FIGS. 1A and 3, the left-hand side wall 2b has biasing force application means 5 attached thereto for giving force for winding up the webbing 3 to the reel shaft 4. Further, the right-hand side wall 2a is provided with seat belt lock activating means 6, as shown in FIGS. 1B, 2 and 3. In addition, the right-hand side wall 2a is provided with deceleration sensing means 7, as shown in FIGS. 1B, 2 and 3. When a predetermined degree of deceleration acts on the vehicle, the deceleration sensing means 7 senses the deceleration and activates the seat belt lock activating means 6.

As apparent from FIG. 1A, the biasing force application means 5 comprise a power spring 8, which is a spiral spring, a bush 9 to which the inner end 8a of the power spring 8 is connected to apply biasing force, a spring casing 10 to which the outer end 8b of the power spring 8 is secured and which accommodates the power spring 8, a cover 11 which is attached to the spring casing 10 to cover the power spring 8, and a cap 12 for sealing a hole for a spring stopper.

The bush 9 is connected to the second rotating shaft 4e so as to be unable to rotate relative to it, thereby allowing the biasing force of the spring 8 to act on the reel shaft 4 through the bush 9 in the webbing winding direction β at all times.

On the other hand, as apparent from FIG. 1B, the seat belt lock activating means 6 comprise a lock gear first cover 13 fixed to the right-hand side wall 2a of the frame 2, a lock gear 14, an inertia member 15 rockably mounted to the lock gear 14, a control spring 16 disposed between the lock gear 14 and the inertia member 15, a main pawl 17 working as a stopping member which has an end rotatably connected to and supported by the joint pin 19 passed through the through-hole 4k and the other end positioned at the second recess 4h and mounted on the right-hand guide flange 4b, a pawl spring 18 accommodated in the first recess 4g of the reel shaft 4 and compressedly disposed between the reel shaft 4 and the main pawl 17, a joint pin 19 piercing the axial through-hole 4k of the reel shaft 4, a back-up pawl 20 having an end which is connected to the end of the joint pin 19 so as not to rotate relative to it and the other end which is positioned at the third recess 4n and mounted on the left-hand guide flange 4c to work as a stopping member, and a lock gear second cover 21 which is connected to and supported by the right-hand side wall 2a of the frame 2 to cover the lock gear first cover 13, the lock gear 14, the inertia member 15, the main pawl 17, the joint pin 19, and the deceleration sensing means 7.

As shown in FIG. 1A, the seat belt retractor 1 comprises a webbing guide 22 which moves corresponding to the amount of unwinding or winding the webbing 3 to guide the webbing 3.

Figure 9:
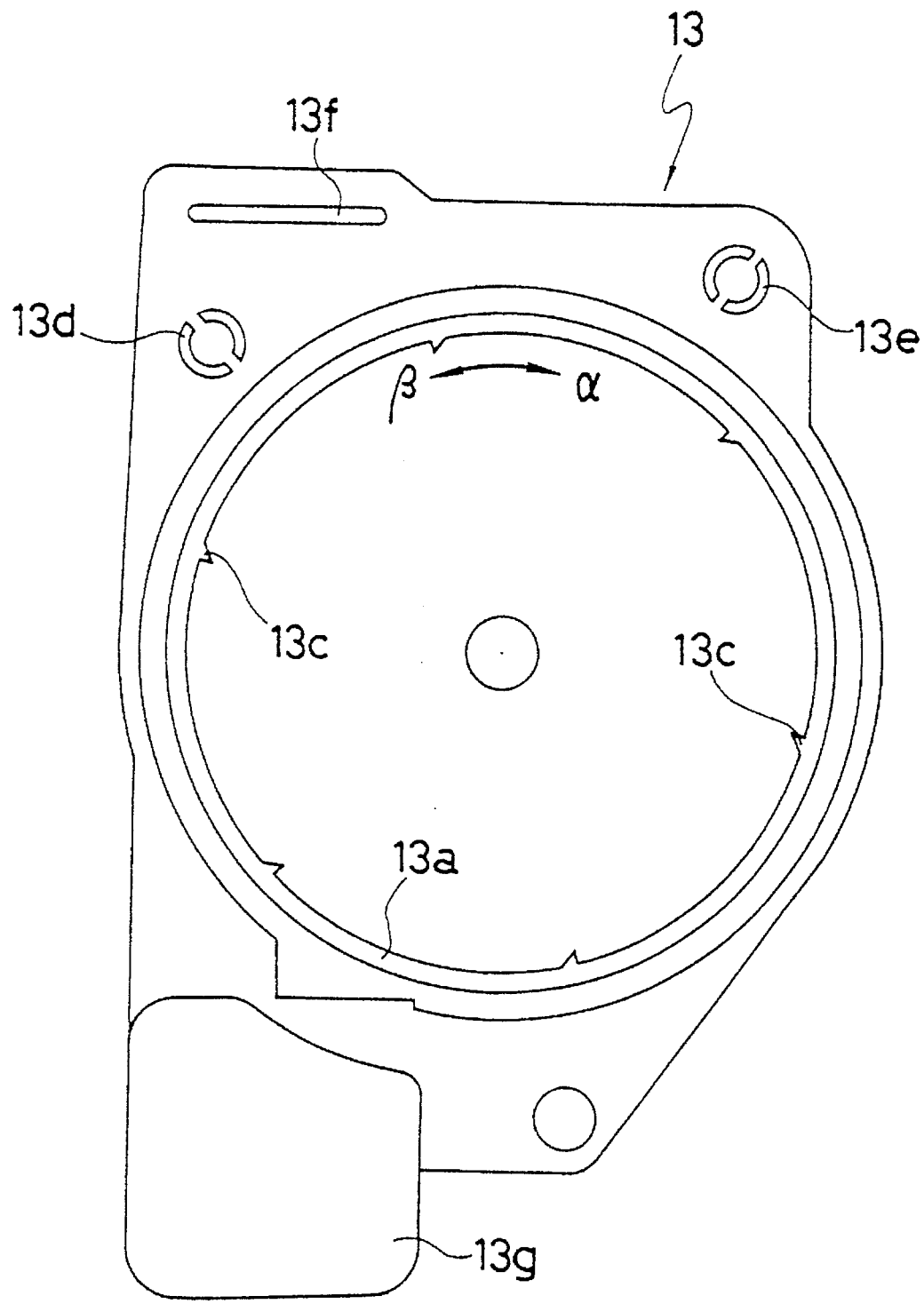
FIG. 9 is a side view of a lock gear first cover employed in the embodiment, as seen from the left-hand side thereof.

As shown in FIG. 9, the lock gear first cover 13 has a projection 13a formed in a relatively large ring shape. The projection 13a has a predetermined number (six in the figure) of teeth 13c, 13c, . . . , formed all around the inside periphery of the projection 13a at same intervals. When the lock gear first cover 13 is fixed to the right-hand side wall 2a, these teeth 13c, 13c, . . . are formed to have the same positional relation with the teeth 2f, 2f, . . . formed on the right-hand side wall 2a. Further, the number of the teeth 13c is set to be a common divisor of the number of the teeth 2f (in the figure, the number of the teeth 13c is six while the number of the teeth 2f is thirty). The number of the teeth 13c is not necessary to be a common divisor of the number of the teeth 2f and can be set to any number less than the number of the teeth 2f. The teeth 13c are not necessary to be disposed at equal pitches in the peripheral direction and may be disposed at unequal pitches. The number of the teeth 13c is preferably a common divisor of the number of the teeth 2f and the teeth 13c are preferably disposed at equal pitches in the peripheral direction.

Each tooth 13c has the triangular cross-sectional configuration. The surface of each tooth that faces the webbing unwinding direction α has a substantially vertical plane, whereas the surface of the tooth that faces a webbing winding direction β has a relatively gentle slope. The lock gear first cover 13 is provided with two stopping projections 13d and 13e. The stopping projections 13d and 13e engage with the fixing holes 2m and 2n formed in the right-hand side wall 2a so that the lock gear first cover 13 is removably mounted to the right-hand side wall 2a of the frame 2.

Further, a horizontal elongated guide hole 13f is formed on the upper portion of the lock gear first cover 13.

Furthermore, an accommodation unit 13g for the deceleration sensing means 7 is disposed on the lower portion of the lock gear first cover 13 to open the surface opposite to the surface shown in the figure. The deceleration sensing means 7 are accommodated and fixed in the accommodation unit 13g.

Figure 10:
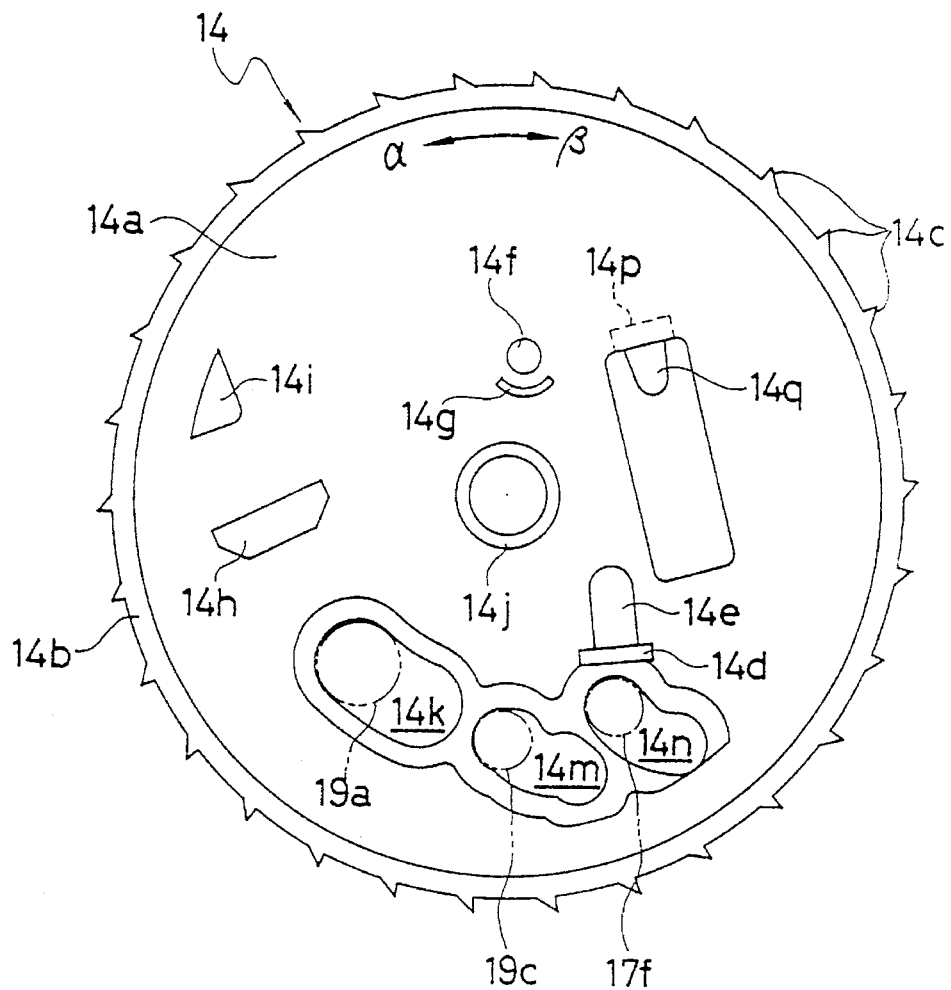
FIG. 10 is a view showing the lock gear employed in the embodiment.

As shown in FIG. 10, the lock gear 14 comprises a circular flat plate portion 14a, and an annular flange 14b that is formed around the outer peripheral edge of the flat plate portion 14a. The outer peripheral surface of the flange 14b is formed with a predetermined number of teeth 14c at equal pitches. Each tooth 14c has a triangular cross-sectional configuration in which the surface of the tooth 14c which faces the webbing unwinding direction α has a relatively gentle slope, whereas, the surface thereof which faces the webbing winding direction β has a substantially vertical plane.

The flat plate portion 14a has a spring retaining portion 14d, for supporting one end of the control spring 16, provided on a surface opposite to a surface facing the right-hand guide flange 4b. The spring retaining portion 14d is provided with a spring guide portion 14e that projects parallel to the flat plate portion 14a. Further, the flat plate portion 14a is provided with a shaft 14f for rockably supporting the inertia member 15, as described later. An arcuate fall preventing member 14g formed in a circular arc shape is provided adjacent to the shaft 14f. When the inertia member 15 engages with the shaft 14f, the inertia member 15 normally does not come off the shaft 14f and is rockably supported by the shaft 14f. When a slight external force is applied to the inertia member 15 in a direction in which it comes off the shaft 4f, the inertia member 15 is readily comes off the shaft 14f. In addition, the flat plate portion 14a is provided with a first stopper 14h and a second stopper 14i and further has a tubular rotating shaft 14j axially projecting from the center of the flat plate portion 14a. The bore of the tubular rotating shaft 14j is pierced with the first rotating shaft 4d of the reel shaft 4 so that the rotating shaft 14j is rotatable about the first rotating shaft 4d.

Further, the flat plate portion 14a is provided with first, second and third cam holes 14k, 14m, and 14n, which extend through the flat plate portion 14a and have predetermined configurations. The first cam hole 14k is formed as a circular arc centered at the rotating shaft 14j.

A surface facing the right-hand guide flange 4b (the surface that is not surrounded with the flange 14b) of the flat plate portion 14a is provided with a spring retaining portion 14p for supporting one end of the pawl spring 18. The spring retaining portion 14p is provided with a spring guide portion 14q which projects parallel to the flat plate portion 14a.

Figure 11:
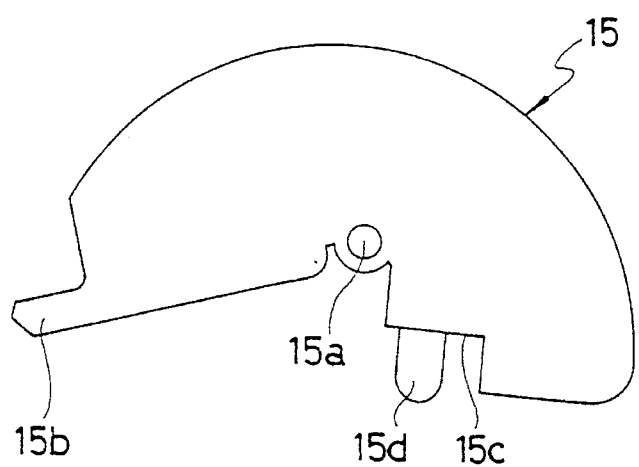
FIG. 11 is a view showing an inertia member employed in the embodiment.

As shown in FIG. 11, the inertia member 15 is formed in an approximately semicircle shape from a flat plate. The inertia member 15 is formed with a hole 15a in the center thereof. Further, the inertia member 15 is formed with the pawl 15b at one end thereof and is provided with a spring retaining portion 15c, for supporting and guiding the other end of the control spring 16, and a spring guide portion 15d at the other end thereof. As shown in FIG. 2, the inertia member 15 is rockably supported on the lock gear 14 by fitting the hole 15a with the shaft 14f of the lock gear 14.

As shown in FIG. 2, the control spring 16 is fitted at both ends thereof to the respective guide portions 14e and 15d of the lock gear 14 and the inertia member 15 in a state that the inertia member 15 is rockably supported on the shaft 14f. The control spring 16 is thus compressedly disposed between the spring retaining portions 14d and 15c. Accordingly, the inertia member 15 is constantly biased in the webbing unwinding direction α relative to the lock gear 14 by the biasing force from the control spring 16, so that it is normally held in a position where it abuts on the first stopper 14h, as shown by the solid line. When the inertia member 15 rotates in the webbing winding direction β relative to the lock gear 14 against the biasing force of the control spring 16, the inertia member 15 assumes a position where it abuts on the second stopper 14i, as shown by the two-dot chain line.

As shown in FIG. 2 and FIG. 3, when the seat belt retractor 1 is in its assembled state, the teeth 13c of the lock gear first cover 13 lie inside the annular flange 14b of the lock gear 14 and is positioned between the flange 14b and the inertia member 15. Since the inertia member 15 is normally held in a position where it abuts on the first stopper 14h, which is shown by the solid line in FIG. 2, the pawl 15b is held in a non-engaging position, which is apart from the teeth 13c. When the inertia member 15 is in a position where it abuts on the second stopper 14i, which is shown by the two-dot chain line in FIG. 2, the pawl 15b assumes a position where it is engageable with a tooth 13c.

If the lock gear 14 rotates in the webbing unwinding direction α when the pawl 15b is in the engageable position, the pawl 15b engages with a tooth 13c, and the lock gear 14 is prevented from further rotating in the webbing unwinding direction α. If the lock gear 14 rotates in the webbing winding direction β when the pawl 15b is in the engageable position, the pawl 15b passes over the teeth 13c while moving along the gentle slopes of the teeth 13c against the biasing force of the control spring 16. Accordingly, the lock gear 14 is rotatable in the webbing winding direction β.

Figures 12A, 12B, 12C, 14A, 14B, 14C:
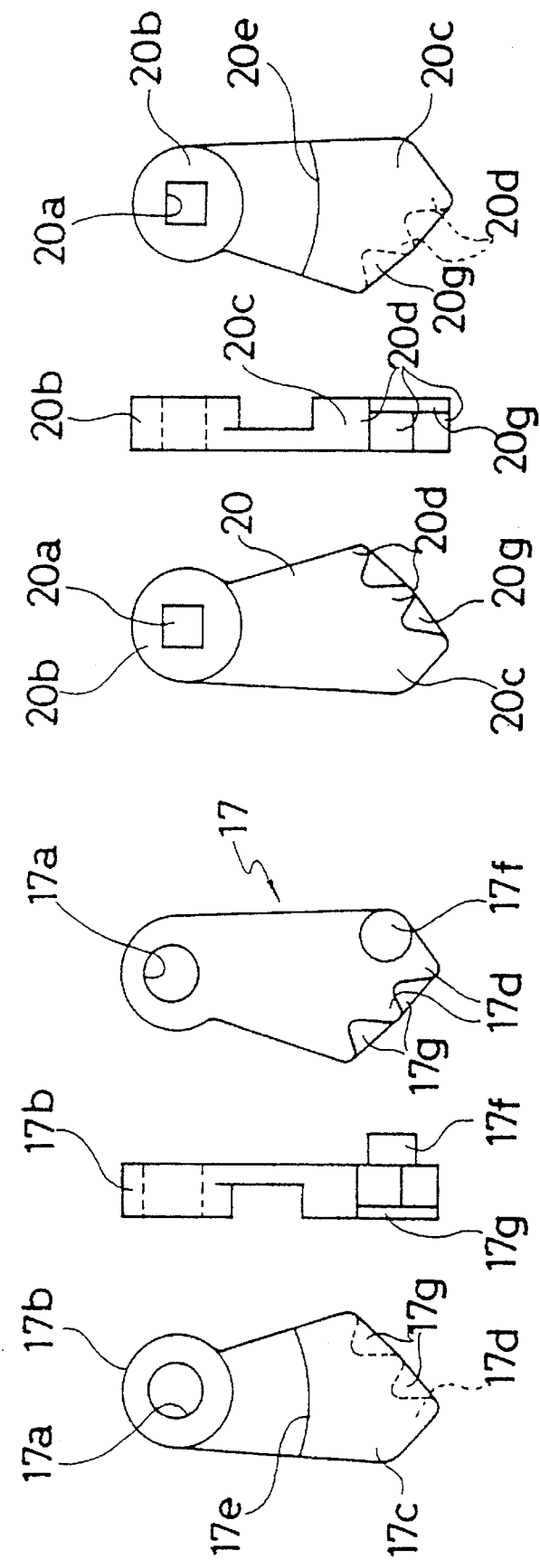
FIG. 12($a$) is a side view of the main pawl as seen from the left-hand side thereof, FIG. 12($b$) is a front view of the main pawl, and FIG. 12($c$) is a side view of the main pawl as seen from the right-hand side thereof.
FIG. 14($a$) is a side view of the backup pawl as seen from the left-hand side thereof, FIG. 14($b$) is a front view of the backup pawl, and FIG. 14($c$) is a side view of the backup pawl as seen from the right-hand side thereof.

As shown in FIGS. 12(a)–12(c), the main pawl 17 is formed in a substantially fan-like shape and has a boss portion 17b formed in a portion which serves as a pivot. The boss portion 17b has a through-hole 17a. The main pawl 17 has a pawl portion 17c formed on an end at an opposite side to the portion which serves as a pivot. In addition, teeth 17d which are engageable with the teeth 2f of the right-hand side wall 2a of the frame 2 are formed at the distal end of the pawl portion 17c.

As shown in FIG. 8(a), the boss portion 17b is fitted with the joint pin 19 which pierces the through-hole 14k and the main pawl 17 is disposed to be rockable between a non-engaging position as shown by the two-dot chain line and the engaging position as shown by the dotted line. At the non-engaging position of the main pawl 17, the teeth 17d formed at the distal end thereof is positioned entirely inside from the outer peripheral surface of the guide flange 4b to reach a position where it does not engage with the teeth 2f of the right-hand side wall 2a of the frame 2. At the engaging position of the main pawl 17, the teeth 17d project outwardly from the outer peripheral surface of the guide flange 4b to reach a position where it engages with the teeth 2f.

In addition, the main pawl 17 has a load transfer portion 17e formed at an end opposite to the teeth 17d of the pawl portion 17c. The load transfer portion 17e is formed from a circular arc which is a part of a circle concentrical with respect to the through-hole 17a and the boss portion 17b. When the main pawl 17 is attached to the right-hand guide flange 4b, the load transfer portion 17e abuts on the load bearing surface 4i of the right-hand guide flange 4b. Since the load transfer portion 17e and the load bearing surface 4i are formed from a circular arcs of the same circle, the load transfer portion 17e abuts on the load bearing surface 4i of the reel shaft 4 at all times irrespective of the position of the main pawl 17. Thus, since the load transfer portion 17e abuts on the load bearing surface 4i of the reel shaft 4, a load applied to the pawl portion 17c of the main pawl 17 is transferred from the load transfer portion 17e to the load bearing surface 4i and borne by the reel shaft 4. In such a load bearing structure, since the teeth 17d, which serve as a point of application of load, and the load transfer portion 17e are relatively close to each other, substantially no bending force is applied on the main pawl 17, but only compressive force is applied thereon substantially. Furthermore, since the load transfer portion 17e and the load bearing surface 4i are in plane contact with each other, the load is transferred to the reel shaft 4 through a relatively wide area and hence dispersed, so that the stress produced therein is relatively small. Accordingly, the level of strength required for the main pawl 17 is lower than that of the conventional main pawl, and thereby the main pawl 17 can be formed by using a relatively lightweight material, e.g., a resin material.

Further, the main pawl 17 has a columnar cam follower 17f projecting from a side thereof which is opposite to the side where the load transfer portion 17e is provided. The cam follower 17f is fitted into the third cam hole 14n of the lock gear 14 so as to be guided along the cam hole 14n.

Further, a large out-of-position preventing portion 17g formed in a web-like shape is disposed on an edge of a surface, in which the teeth 17d are disposed, at the load transfer portion 17e side. The large out-of-position preventing portion 17g is positioned inside of the right-hand side wall 2a as shown by the two-dot chain line in FIG. 3 when the teeth 17d engage with the teeth 2f of the right-hand side wall 2a. Thereby, even if the main pawl 17 moves by an unbalanced load or the like in a direction which it is apart from the right-hand guide flange 4b so that the teeth 17d is not right place relative to the teeth 2a, the large out-of-position preventing portion 17g prevents the engagement between the teeth 17d and the teeth 2f from being out of position because the large out-of-position preventing portion 17g abuts on the inner surface of the right-hand side wall 2a.

The pawl spring 18 is accommodated in the first recess 4g of the reel shaft 4 and fitted to the spring guide portion 14q of the lock gear 14 so as to be compressedly disposed between the wall surface of the first recess 4g and the spring retaining portion 14p. Accordingly, the pawl spring 18 constantly biases the main pawl 17 relative to the reel shaft 4 in the webbing unwinding direction α. Thus, the main pawl 17 is normally set at the non-engaging position by the biasing force of the pawl spring 18.

As shown in FIGS. 13(a)–13(c), the joint pin 19 has a body 19a that is formed with a circular cross-sectional configuration. The body 19a is formed at the right-hand end thereof, as viewed in FIG. 13(a), with an arm 19b that extends at right angles to the body 19a. A cam follower 19c having a circular cross-sectional configuration is provided at the distal end of the arm 19b. The cam follower 19c is fitted into the second cam hole 14m of the lock gear 14 so as to be guided along the cam hole 14m. Further, a shaft portion 19d having rectangular cross-sectional configuration is formed at the other end of the body 19a. The shaft portion 19d is fitted into a hole formed in one end portion of the backup pawl 20, described later, so as to be unable to rotate relative to the backup pawl 20. Accordingly, when the arm 19b pivots in response to the movement of the cam follower 19c guided along the second cam hole 14m, the body 19a rotates, and the rotation of the body 19a is transferred to the backup pawl 20. Thus, the backup pawl 20 pivots corresponding to the movement of the cam follower 19c guided along the second cam hole 14m.

As shown in FIGS. 14(a)–(c), the backup pawl 20 is formed in a substantially fun-like shape and has a boss portion 20b formed in a portion which serves as a pivot. The boss portion 20b has a through-hole 20a of rectangular cross-section. The backup pawl 20 has a pawl portion 20c formed at an end thereof opposite to the pivot. Further, teeth 20d which are engageable with the teeth 2g of the left-hand side wall 2b of the frame 2 are formed at the distal end of the pawl portion 20c. As shown in FIG. 8(b), the shaft portion 19d of the joint pin 19 is fitted into the through-hole 20a of the boss portion 20b so as to be unable to rotate relative to the backup pawl 20. The backup pawl 20 is fixed to the joint pin 19 by a screw 23. Accordingly, the backup pawl 20 is disposed with the joint pin as the center to be rockable between a non-engaging position as shown by the two-dot chain line and the engaging position as shown by the dotted line relative to the left-hand guide flange 4c of the reel shaft 4. At the non-engaging position of the backup pawl 20, the teeth 20d formed at the distal end thereof is positioned entirely inside from the outer peripheral surface of the guide flange 4c to reach a position where it does not engage with the teeth 2g of the left-hand side wall 2b of the frame 2. At the engaging position of the backup pawl 20, the teeth 20d project outwardly from the outer peripheral surface of the guide flange 4c to reach a position where they engage with the teeth 2g.

In addition, the backup pawl 20 has a load transfer portion 20e formed at an end opposite to the teeth 20d of the pawl portion 20c. The load transfer portion 20e is formed from a circular are which is a part of a circle concentrical with respect to the through-hole 20a and the boss portion 20b. When the backup pawl 20 is attached to the left-hand guide flange 4c, the load transfer portion 20e abuts on the load bearing surface 4p of the left-hand guide flange 4c. Since the load transfer portion 20e and the load bearing surface 4p are formed from circular arcs of the same circle, the load transfer portion 20e abuts on the load bearing surface 4p at all times irrespective of the position of the backup pawl 20. Thus, since the load transfer portion 20e abuts on the load bearing surface 4p, a load applied to the pawl portion 20c of the backup pawl 20 is transferred from the load transfer portion 20e to the load bearing surface 4p and borne by the reel shaft 4. Also in the backup pawl 20, the stress produced therein is relatively small as well as the main pawl 17 as described above. Accordingly, the backup pawl 20 can be formed by using a relatively lightweight material, e.g., a resin material.

Further, a large out-of-position preventing portion 20g formed in a web-like shape is disposed on the teeth 20d at the load transfer portion 20e side. The large out-of-position preventing portion 20g is positioned inside the left-hand side wall 2b as shown by the two-dot chain line in FIG. 3 when the teeth 20d engage with the teeth 2g of the left-hand side wall 2b. Thereby, even if the backup pawl 20 moves by an unbalanced load or the like in a direction which it is apart from the left-hand guide flange 4c so that the teeth 20d are not right place relative to the teeth 2g, the large out-of-position preventing portion 20g prevents the engagement between the teeth 20d and the teeth 2g from being out of position because the large out-of-position preventing portion 20g abuts on the inner surface of the left-hand side wall 2b.

Figure 15:
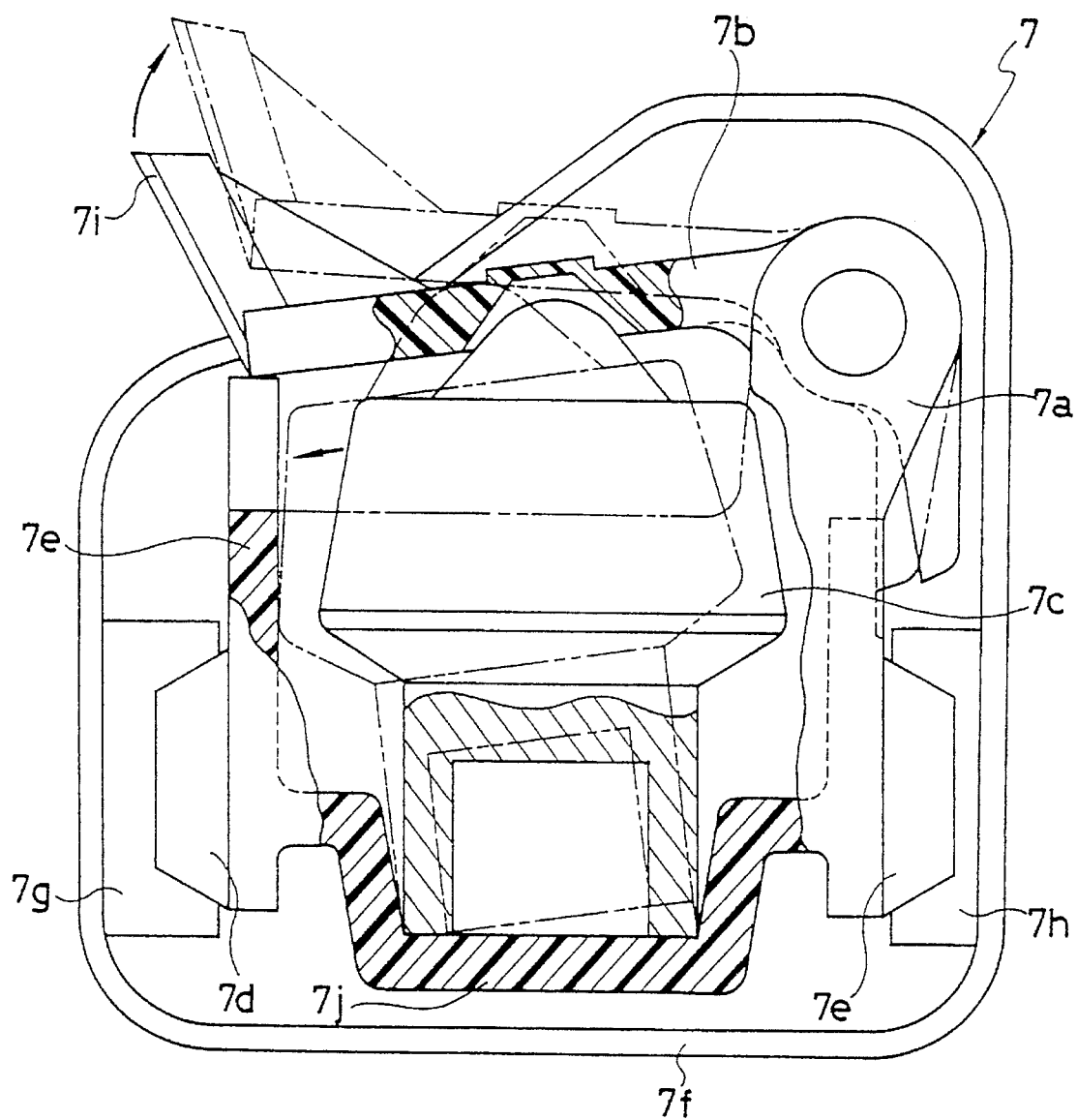
FIG. 15 is a partly-cutaway view of deceleration sensing means employed in the embodiment.

As shown in FIG. 15, the deceleration sensing means 7 has a casing 7a, a lever 7b which is pivotably supported by the casing 7a, and an inertia member 7c which is accommodated in the casing 7a so that when the vehicle is in a normal state, the inertia member 7c is in the position shown by the solid line, whereas, when deceleration exceeding a predetermined value acts on the vehicle, the inertia member 7c tilts to the position shown by the two-dot chain line.

Engaging projections 7d and 7e are fitted into the recesses of guide members 7g and 7h of a supporting member 7f so that the casing 7a is supported by the supporting member 7f. The supporting member 7f is fixed in the accommodation unit 13g of the lock gear first cover 13. The lever 7b has a rear end rotatably supported to the casing 7a and is provided with a pawl 7i, which is engageable with the teeth 14c of the lock gear 14, at a front end thereof.

The inertia member 7c is mounted on a mounting portion 7j of the casing 7a. In a normal state, the inertia member 7c erects perpendicularly to the mounting portion 7j, as shown by the solid line, and supports the lever 7b in a substantially horizontal position shown by the solid line. In this solid-line position, the lever 7b is placed in a non-engaging position where the pawl 7i does not engage with the teeth 14c of the lock gear 14.

When a predetermined degree of deceleration acts on the vehicle, the inertia member 7c tilts until the outer peripheral surface of the upper portion thereof substantially abuts on the inner surface of the front wall of the casing 7a, as shown by the two-dot chain line. The tilting of the inertia member 7c causes the lever 7b to push up. Accordingly, the lever 7b pivots to the position shown by the two-dot chain line. In the two-dot chain line position, the lever 7b is engageable with a tooth 14c of the lock gear 14.

As shown in FIG. 1A, the webbing guide 22 has a body 22b which is disposed between the two side walls 2a and 2b of the frame 2 and which has in its center a hole 22a that is passed through by the webbing 3. The webbing guide 22 further has projecting shafts 22c and 22d with elongated circular shapes in cross section which project longitudinally from two ends, respectively, of the body 22b and which are slidably fitted into the guide hole 11a formed in the cover 11 of the power spring 8 and the guide holes 13f formed in the lock gear first cover 13, respectively.

The webbing guide 22 slides along the guide holes 11a, 13f in accordance with the roll diameter of the webbing 3 taken up on the reel shaft 4, thereby constantly guiding the webbing 3 along the axial direction of the hole 22a. Thereby, the guiding angle of the webbing 3 relative to the webbing guide 22 is substantially constant so that the webbing 3 is wound on or off smoothly and is protected from scuffing by the webbing guide 22.

Since the projecting shafts 22c and 22d are formed with elongated circular shapes in cross section, the webbing guide 22 never rotate about the projecting shafts 22c and 22d as an axis so as not to be tilted. Accordingly, the webbing guide 22 can smoothly slide along the guide holes 11a, 13f, thereby allowing the webbing 3 to be further smoothly wound on and off. When the webbing guide 22 slides, right and left end walls 22g and 22h of the body 22a are guided along the inner surfaces of the cover 11 of the frame 2 and the lock gear first cover 13, respectively, so as to prevent the webbing guide 22 from rotating about an vertical axis. Therefore, the webbing guide 22 can further smoothly slide along the guide holes 11a and 13f.

Hereinafter, the operations of the main pawl 17 and the backup pawl 20 will be explained in detail with reference to FIGS. 16(a)–16(g) and 16(a)'–16(h)'. It should be noted that each of FIGS. 16(a)–16(g) shows the operation of the main pawl 17, whereas each of FIGS. 16(a)'–16(h)' shows the operation of the backup pawl 20. In addition, FIGS. 16A and 16B are schematic views in which the teeth 2f, the teeth 17d and the three cam holes 14k, 14m and 14n at the main pawl 17 side are illustrated on the same plane, and in which both the main pawl 17 and the backup pawl 20 are seen from the right-hand side as viewed in FIG. 3.

Referring to FIGS. 16(a)–16(d) and 16(a)'–16(d)'; the reel shaft 4 (shown only the through-hole 4k, which is pierced with the body 19a of the joint pin 19, and the main pawl 17, which is provided on the reel shaft 4 in FIGS. 16(a)–16(d) is constantly biased in the webbing winding direction β relative to the lock gear 14 (shown only the cam holes 14k, 14m and 14n in FIG. 16A) by the biasing force of the pawl spring 18 (not shown in FIGS. 16(a)–16(d), see FIG. 1B or the like). Therefore, the reel shaft 4 rotates in the webbing winding direction β relative to the lock gear 14 until the body 19a abuts on the upper end edge of the cam hole 14k, thus reaching a normal state as shown in FIG. 16(a).

In the normal state, the cam follower 19c of the joint pin 19 abuts on the upper end edge of the cam hole 14m, and the cam follower 17f of the main pawl 17 abuts on the upper end edge of the cam hole 14n. In addition, the teeth 17d of the main pawl 17 are far apart from the teeth 2f of the right-hand side wall 2a, so that the main pawl 17 assumes a non-engaging position where the teeth 17d do not engage with the teeth 2f. On the other hand, the backup pawl 20 assumes the position shown in FIG. 16(a) in accordance with the angle of rotation of the joint pin 19 that is determined by positions at which the cam followers 19c and 17f abut on the respective upper end edges of the cam holes 14m and 14n. That is, the pawl 20d of the backup pawl 20 is far apart from the teeth 2g of the left-hand side wall 2b so that the backup pawl 20 also assumes a non-engaging position where the pawl 20d does not engage with the teeth 2g.

When the reel shaft 4 rotates in the webbing unwinding direction α relative to the lock gear 14 about the first rotating shaft 4d (see FIG. 7), that is, when the through-hole 4k, which is pierced with the body 19a, rotates in the direction α relative to the first to third cam holes 14k, 14m and 14n of the lock gear 14 about the first rotating shaft 4d, the body 19a and the boss portion 17b of the main pawl 17 move a little downward along and relative to the first cam hole 14k, as shown in FIG. 16(b).

At the same time, the cam follower 17f moves a little downward by being guided by the third cam hole 14n. In this case, the boss portion 17b also moves a little leftwardly as viewed in the figure in accordance with the cam profile of the first cam hole 14k, and the cam follower 17f moves a little leftwardly in accordance with the cam profile of the third cam hole 14n. Since the amount of the leftward movement of the cam follower 17f is a little larger than that of the boss portion 17b, the main pawl 17 pivots a little in the direction β. Thereby, the teeth 17d approach the teeth 2f.

Further, at the same time, the cam follower 19c moves downward by being guided by the second cam hole 14m. In this case, since the cam follower 19c also moves rightwardly in accordance with the cam profile of the second cam hole 14m, the arm 19b pivots a little in the direction α about the body 19a. The pivoting motion of the arm 19b in the direction α causes the body 19a to rotate also a little in the direction α. However, the body 19a and the arm 19b do not substantially rotate relative to the reel shaft 4 because the reel shaft 4 also rotates in the direction α. Accordingly, the backup pawl 20 is held in the non-engaging position, as shown in FIG. 16(b).

As shown in FIGS. 16(c) and 16(c)', as the reel shaft 4 further rotates in the direction α relative to the lock gear 14, the body 19a and the boss portion 17b further move downward and leftwardly along the first cam hole 14k, respectively. At the same time, the cam follower 17f further moves a little downward by being guided by the third cam hole 14n.

Since the amount of the further leftward movement of the cam follower 17f is a little larger than that of the boss portion 17b, the main pawl 17 further pivots a little in the direction β, so that the teeth 17d further approach the teeth 2f to begin engaging with the teeth 2f.

Further, at the same time, the cam follower 19c further moves a little downward and leftwardly by being guided by the second cam hole 14m. In this case, since the cam follower 19c also moves a little downward and leftwardly in accordance with the cam profile of the second cam hole 14m, the arm 19b does not pivot substantially. However, since the reel shaft 4 further moves in the direction α, the body 19a and the arm 19b rotate in the direction β relative to the reel shaft 4. Thereby, the backup pawl 20 pivots a little in the direction β relative to the reel shaft 4, so that the teeth 20d approach the teeth 2g.

As shown in FIGS. 16(d) and 16(d)', when the reel shaft 4 further rotates in the direction α relative to the lock gear 14, the main pawl 17 further pivots a little in the direction β relative to the reel shaft 4 in the same way as the above, so that the teeth 17d engage the teeth 2f plainly. Similarly, the backup pawl 20 further pivots a little in the direction β, so that the teeth 20d begin to engage with the teeth 2g. In this manner, the teeth 20d of the backup pawl 20 starts to engage with the teeth 2g a little bit later than that the teeth 17d of the main pawl 17 engage with the teeth 2f.

As shown in FIGS. 16(e) and 16(e)', as the reel shaft 4 further rotates in the direction α relative to the lock gear 14, the main pawl 17 and backup pawl 20 further rotate in the direction β relative to the reel shaft 4 in the same way as the above. Accordingly, the amount of engaging the teeth 17d with the teeth 2f and the amount of engaging the teeth 20d with the teeth 2g increase respectively.

As shown in FIGS. 16(f) and 16(f)', when the reel shaft 4 further rotates in the direction α, thereby the teeth 17d substantially engage with teeth 2f, while the amount of engaging the teeth 20d with the teeth 2g further increases.

Figure 16H:
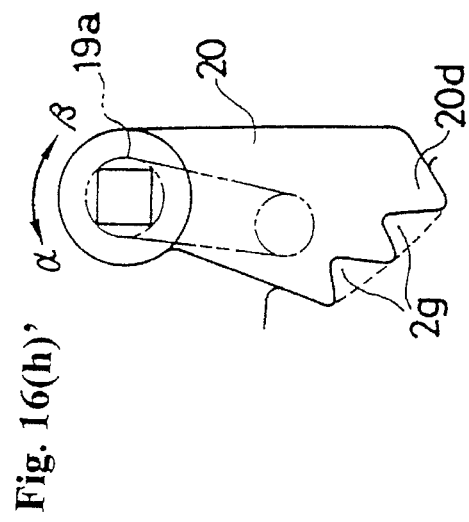
FIGS. 16($a$)–16($g$) and 16($a$)'–16($h$)' are explanatory views for explaining the operation of the main pawl and a backup pawl in the embodiment.
Figure 16G:
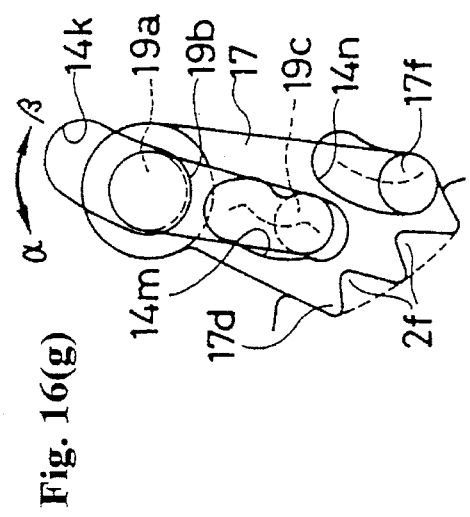
Figure 16G:
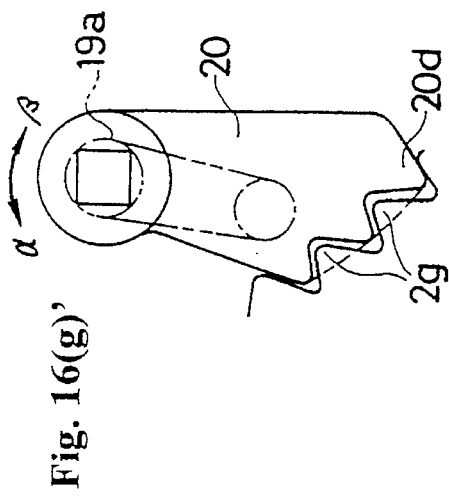

As shown in FIGS. 16(g) and 16(g)', when the reel shaft 4 further rotates in the direction α, thereby the teeth 17d completely engage with teeth 2f. Accordingly, main pawl 17 completely engages with the teeth 2f of the right-hand side wall 2a, while the teeth 20d substantially engage with teeth 2g.

As shown in FIG. 16(h)', when the reel shaft 4 further rotates in the direction α, thereby the complete engagement between the teeth 17d and the teeth 2f is maintained and the backup pawl 20 completely engages with the teeth 2g of the left-hand side wall 2b.

In this embodiment, in this manner, as the reel shaft 4 rotates in the direction α relative to the lock gear 14, the teeth 17d of the main pawl 17 first staff to engage with the teeth 2f of the right-hand side wall 2a and the teeth 20d of the backup pawl 20 then start to engage with the teeth 2g of the left-hand side wall 2b. The teeth 17d completely engage with the teeth 2f, and then the teeth 20d completely engage with the teeth 2g. Thereby, it is not possible to cause error at least in one of the engagement between the main pawl 17 and teeth 2f, and the engagement between the backup pawl 20 and the teeth 2g. Accordingly, these engagements are securely performed.

Figure 17:
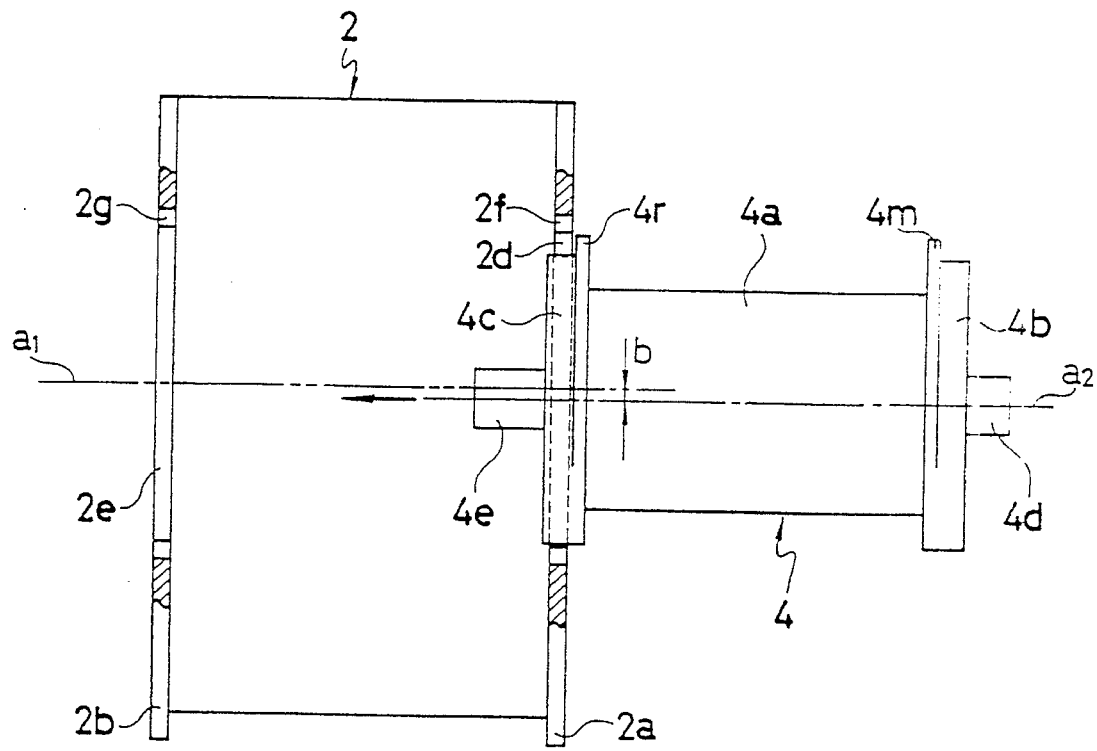
FIG. 17 is a view for explaining one part of the procedure of assembling the reel shaft into the frame in the embodiment.
Figure 18:
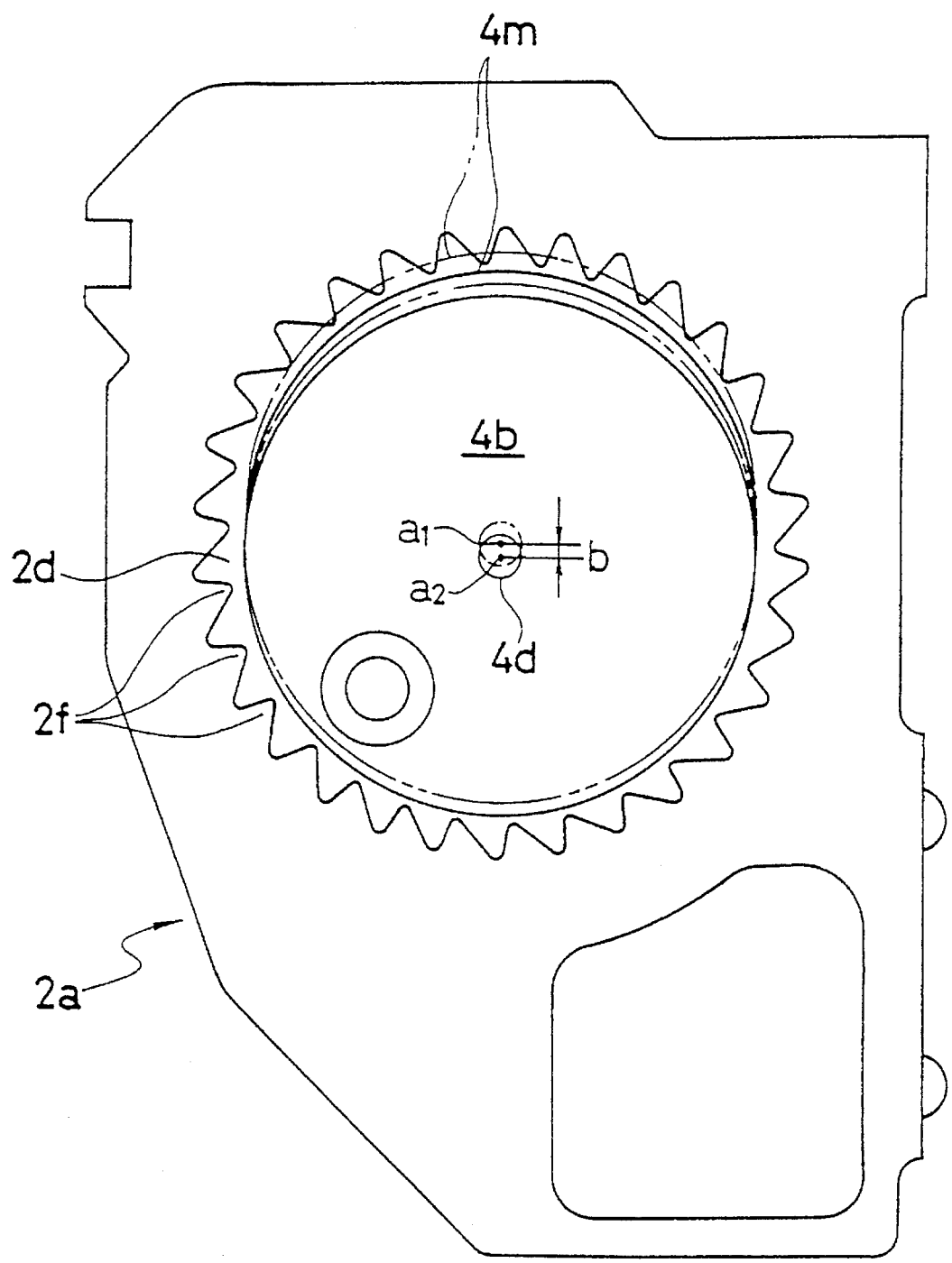
FIG. 18 is a side view of the state shown in FIG. 17 as seen from the right-hand side thereof.
Figure 22:
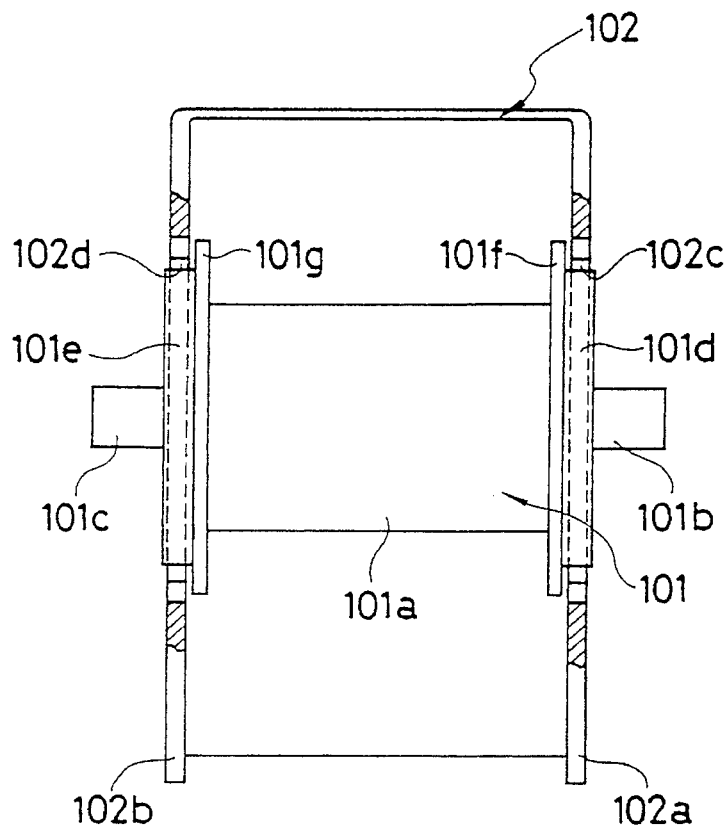
FIG. 22 is a view for explaining a frame and a reel shaft of a typical conventional seat belt retractor with an example.
Figure 23:
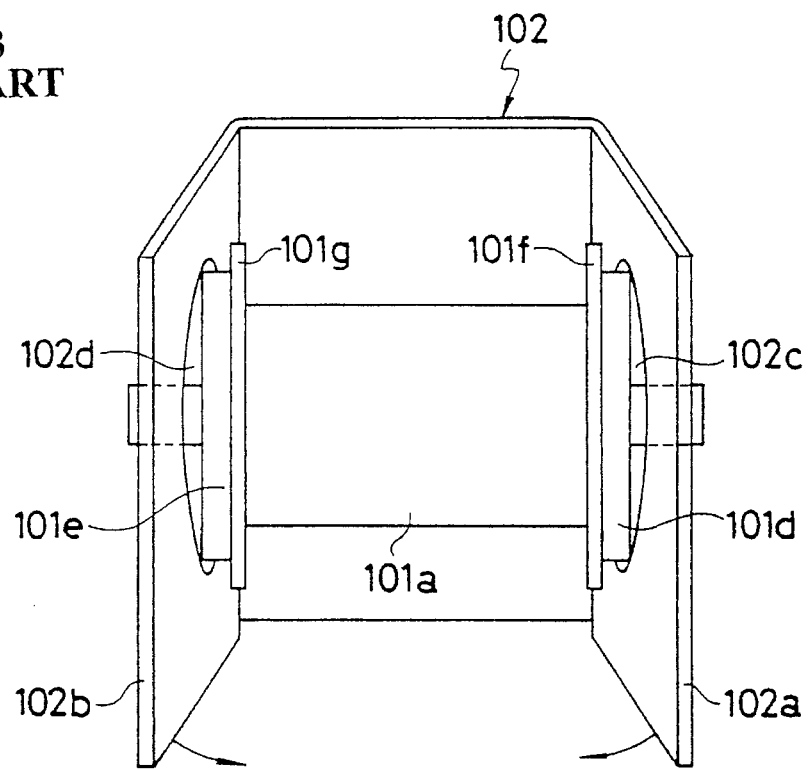
FIG. 23 is a view for explaining an assembly of the frame and a reel shaft in the conventional seat belt retractor.

By the way, in the seat belt retractor of this embodiment, in order to insert the webbing winding portion 4a to be positioned between the right-hand and left-hand side walls 2a and 2b in a state that the through-holes 2d and 2e of the right-hand and left-hand side walls of the U-shaped frame 2 are pierced with the both ends of the reel shaft 4, first, the central axis $a_2$ of the reel shaft 4 is eccentrically shifted, for example, from the central axis $a_1$ of the through-hole 2d of the right-hand side wall 2a by an eccentric amount "b" to coincide the peripheral edge of the profile consisting of the left-hand guide flange 4c and the fall preventing flange 4r with the through-hole 2d, as shown in FIGS. 17 and 18.

Figure 19:
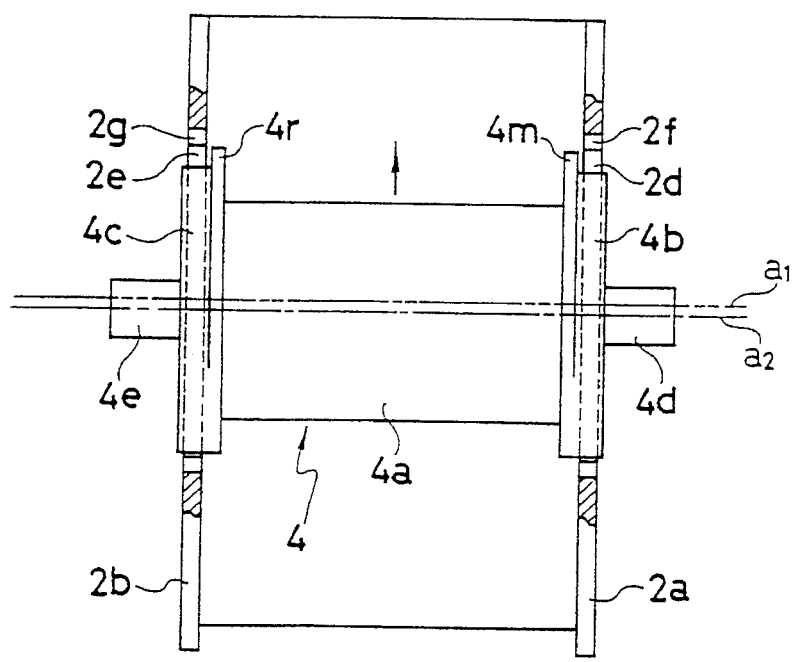
FIG. 19 is a view for explaining another part of the procedure of assembling the reel shaft into the frame in the embodiment.

In this state, as shown in FIG. 19, the reel shaft is passed through the through-hole 2d so that the left-hand guide flange 4c is positioned in the through-hole 2e of the left-hand side wall 2b and the right-hand guide flange 4b is positioned in the through-hole 2d of the right-hand side wall 2a. Further in this state, the reel shaft 4 is moved upward to align the central axis $a_2$ of the reel shaft 4 with the central axis $a_1$ of the through-hole 2d of the right-hand side wall 2a as shown in FIG. 20. Thereby, the reel shaft 4 is assembled in the predetermined position of the frame 2.

In the state that the reel shaft 4 is assembled in the predetermined position of the frame as mentioned above, parts of the right and left fall preventing flanges 4m and 4r are positioned inside of at least the teeth 2f and 2g of the right-hand and left-hand side walls 2a and 2b, respectively. Therefore, as shown in FIG. 21(a), even if the reel shaft 4 is about to come off the right side, the right fall preventing flange 4m abuts on the right-hand side wall 2a or the teeth 2f of the right-hand side wall 2a so as to prevent the reel shaft 4 from passing through the through-hole 2d to the right. In the same way, as shown in FIG. 21(b), even if the reel shaft 4 is about to come off the left side, the left fall preventing flange 4r abuts on the left-hand side wall 2b or the teeth 2g of the left-hand side wall 2b so as to prevent the reel shaft 4 from passing through the through-hole 2e to the left.

Thus, according to this embodiment, the seat belt retractor is easily assembled without time and labor, only by aligning the central axis $a_2$ of the reel shaft 4 with the central axis $a_1$ of the through-holes 2d and 2e after the through-holes 2d and 2e of the right-hand and left-hand side walls 2a and 2b of the U-shaped frame 2 are eccentrically pierced with the both ends of the reel shaft 4. In addition, since the frame 2 may be formed in the U-shape from the beginning, the previous process, e.g. the right-hand and left-hand side walls are bent to make the distance between them larger toward their ends as, in the prior art, is not required. Therefore, it is possible to reduce the assembly work. Further, after the reel shaft 4 is assembled in the predetermined position, the reel shaft 4 is securely prevented from coming off the frame 2 by the fall preventing flanges 4m and 4r.

Particularly according to this embodiment, since the fall preventing flanges 4m and 4r are positioned substantially opposite to the engaging portion between the teeth 17d of the main pawl 17 and the teeth 2f of the right-hand side wall 2a, and the engaging portion between the teeth 20d of the backup pawl 20 and the teeth 2g of the left-hand side wall 2b, respectively, the reel shaft 4 moves by the reaction forces from the main pawl 17 and the backup pawl 20. Therefore, when the peripheral surfaces of the right-hand and left-hand guide flanges 4b and 4c abut on the teeth 2f and 2g, the reel shaft 4 is securely prevented from coming off the frame because the fall preventing flanges 4m and 4r are formed on the peripheral surface of the right-hand and left-hand flanges 4b and 4c, where they abut on the teeth 2f and 2g.

Though the fall preventing flanges 4m and 4r are formed in a successive circular-arc shape in this embodiment, the fall preventing flanges may be divided into predetermined sections in a peripheral direction, or may be projections having a width to abut on the teeth 2f and 2g, that is, projections in any shape having the maximum dimension defined in the present invention.

Hereinafter, the operation of the seat belt retractor in this embodiment, arranged as described above, will be explained. [Normal state where no deceleration exceeding a predetermined value acts on the vehicle]

In this state, the inertia member 7c of the deceleration sensing means 7 do not tilt forwardly. Therefore, the lever 7b is held in the solid line position as shown in FIG. 2, and the pawl 7i is placed in the non-engaging position, which is apart from the teeth 14c of the lock gear 14. Similarly, the pawl 15b of the inertia member 15, the main pawl 17 and the backup pawl 20 are held in the non-engaging positions respectively, as shown in FIGS. 2 and 4.

Accordingly, in this state, the seat belt retractor 1 mainly performs an operation based on the action of the biasing force application means 5. That is, the reel shaft 4 is biased in the webbing winding direction β by the biasing force of the power spring 8 of the biasing force application means 5 so as to wind up the webbing 3. (When the seat belt is not fastened to the occupant's body)

In this state, a tongue (not shown), which is attached to the webbing 3, is separated from a buckle member (not shown). Accordingly, the webbing 3 has been wound up by the biasing force of the power spring 8, as described above.

In this state, the amount of winding up the webbing is maximum. Therefore, the webbing guide 22 is positioned at the most right side of the stroke of the webbing guide 22 as shown in FIG. 2. (When the webbing is unwound)

As the occupant unwinds the webbing 3 in order to fasten it to his/her body, the reel shaft 4 and the bush 9 rotate in the webbing unwinding direction α in response to the unwinding of the webbing 3. Thereby, the power spring 8 is gradually wound up. In this stage, the amount of the webbing 3 wound is decreased in response to the amount of the webbing 3 unwound. According to the decrease of the amount of wound webbing, the position of unwinding the webbing 3 from the seat belt retractor 1 moves leftwardly as viewed in FIG. 2. The change of the position of unwinding the webbing 3 causes the webbing guide 22 to move leftwardly as viewed in FIG. 2. (When the occupant takes his/her hand off the webbing after connecting the tongue with the buckle member)

At the time when the occupant connects together the tongue and the buckle member, the webbing 3 has been unwound excessively when the occupant has it fastened to his/her body in a normal state. Therefore, when the occupant takes his/her hand off the webbing 3 after connecting the tongue with the buckle member, the webbing 3 is wound up by the biasing force of the power spring 8 until it fits to the occupant's body. The biasing force of the power spring 8 is properly set so that the webbing 3 will not give a sensation of pressure to the occupant. In winding up the webbing 3 by the power spring 8, the position of unwinding the webbing 3 from the seat belt retractor 1 moves rightwardly as viewed in FIG. 2. The change of the position of unwinding the webbing 3 causes the webbing guide 22 to move rightwardly as viewed in FIG. 2.

During the running of the vehicle, the seat belt retractor 1 maintains this state unless deceleration exceeding a predetermined value acts on the vehicle. When the occupant normally moves forward, the webbing is unwound freely so that the occupant can freely change his or her sitting position. Also during the forward movement of the occupant's body, the position of unwinding the webbing 3 from the seat belt retractor 1 moves leftwardly. The change of the position of unwinding the webbing 3 causes the webbing guide 22 to move leftwardly as viewed in FIG. 2. [When deceleration exceeding a predetermined value acts on the Vehicle]

When deceleration exceeding a predetermined value acts on the vehicle during the running due to a sudden braking operation or the like, both the seat belt lock activating means 6 and the deceleration sensing means 7 operate. As a first stage of the operation, the inertia member 7c of the deceleration sensing means 7 move forwardly (the position shown by the two-dot chain line in FIG. 2) by its inertia, so that the lever 7b pivots upwardly to reach the position shown by the two-dot chain line in FIG. 2. Thereby, the pawl 7i of the lever 7b assumes an engaging position where it is engageable with a tooth 14c of the lock gear 14. While, the occupant's body is urged to move forwardly by the deceleration acting on the vehicle to a degree higher than a predetermined value, thus causing the webbing 3 to be unwound. The unwinding of the webbing 3 causes both the reel shaft 4 and the lock gear 14 to rotate in the unwinding direction α.

However, since a tooth 14c of the lock gear 14 engages with the pawl 7e immediately, the lock gear 14 is immediately stopped from rotating in the unwinding direction α. As a result, only the reel shaft 4 continuously rotates in the unwinding direction α. Thus, the reel shaft 4 rotates in the direction α relative to the lock gear 14.

The relative rotation of the reel shaft 4 in the direction α causes the main pawl 17 to pivot in the direction β relative to the reel shaft 4 and to engage with the teeth 2f, as a second stage of the operation, as shown in FIGS. 16(a)–16(g) and 16(a)'–16(h)'. Thereafter, with a little delay, the backup pawl 20 pivots in the direction β relative to the reel shaft 4 and thereby engages with the teeth 2g. Thereby, the reel shaft 4 is locked from rotating in the webbing unwinding direction α. As a result, unwinding of the webbing 3, which would otherwise be caused by the inertial forward movement of the occupant's body, is surely prevented. Thus, the occupant's body is reliably restrained and protected. At this time, since the webbing 3 is unwound very little, the webbing guide 22 moves very little. [When unwinding force suddenly acts on the webbing]

When such a situation occurs, since the webbing 3 is suddenly unwound, the reel shaft 4, the lock gear 14 and the inertia member 15 are suddenly urged to rotate in the webbing unwinding direction α. However, since the biasing force of the control spring 16 is not so strong, the control spring 16 contracts, so that the inertia member 15 has an inertia delay. That is, the inertia member 15 not only revolves in the webbing unwinding direction α together with the lock gear 14 but also rotates in the direction β relative to the lock gear 14.

The rotation of the inertia member 15 causes the pawl 15b to move to the engaging position where it abuts on the second stopper 14i, and engages with a tooth 13c of the lock gear first cover 13, as shown by the two-dot chain line in FIG. 2. Thereby, the revolution of the inertia member 15 and the rotation of the lock gear 14 in the webbing unwinding direction α are stopped. Accordingly, only the reel shaft 4 rotates in the webbing unwinding direction α. Thus, the reel shaft 4 rotates in the direction α relative to the lock gear 14 as described above.

The relative rotation of the reel shaft 4 in the direction α causes the main pawl 17 to pivot and engage with the teeth 2f, and thereafter, with a little delay, the backup pawl 20 engages with the teeth 2g, in the same manner as described above. Thus, the reel shaft 4 is locked from rotating in the webbing unwinding direction α. As a result, unwinding of the webbing 3, which would otherwise be caused by the inertial forward movement of the occupant's body, is surely prevented. Thus, the occupant's body is reliably restrained and protected. In this case also, since the webbing 3 is unwound very little, the webbing guide 22 moves very little.

The present invention is not confined to the above mentioned embodiment and is possible to change its design in many ways. For example, though a case that the present invention is adapted to the seat belt retractor in which the main pawl 17 and the backup pawl 20 mounted on the guide flanges 4b and 4c at the both side of the reel shaft 4 engage with the teeth formed in the frame is described in the above mentioned embodiment, the present invention can be adapted to a seat belt retractor in any type.

As apparent from the foregoing description, according to the seat belt retractor of the present invention, only by aligning the central ,axis of the reel shaft with the central axis of the through-holes after the through-holes of the right-hand and left-hand side walls of the frame are eccentrically pierced with the both ends of the reel shaft, the seat belt retractor can be easily assembled and it is possible to reduce time and labor. In addition, since the frame may be formed in the U-shape from the beginning, the after-processing, i.e. the right-hand and left-hand side walls are bent in to make the distance between them larger toward their ends as the prior art is not required. Therefore, it is possible to reduce the assembly work. Further, after the reel shaft is assembled in the predetermined position, the reel shaft is securely prevented from coming off the frame by the fall preventing flanges.

Furthermore, according to this embodiment, when the stopping members engage the teeth of the inside periphery of the through-holes and the reaction force is supported by the frame through the stopping member and the reel shaft, the reel shaft is about to come off the right-hand side wall or left-hand side wall due to the reaction forces acting eccentrically to the reel shaft, the reel shaft is securely prevented from coming off the frame.

What we claim is:

1. A seat belt retractor comprising a reel shaft having a webbing winding portion, and a frame having right-hand and left-hand side walls each of which has a circular through-hole pierced with said reel shaft, said webbing winding portion being positioned inside said right-hand and left-hand side walls, wherein;

said webbing winding portion has at least one projection protruding in the radial direction at least on one of right and left sides thereof, and the maximum dimension of a profile formed with said projection and said webbing winding portion is smaller than the diameter of said adjacent through-hole and is set so that said projection projects radially beyond the dimension of the through-hole when the center of said through-hole is aligned with the central axis of said reel shaft.

2. A seat belt retractor as claimed in claim 1, wherein said webbing winding portion projections formed on both of right and left sides of said webbing winding portion.

3. A seat belt retractor as claimed in claim 1 wherein said projection comprises an arcuate flange.

4. A seat belt retractor as claimed in claim 3, wherein said arcuate flange is divided into predetermined sections.

5. A seat belt retractor as claimed in claim 1, further comprising locking means disposed between said frame and said reel shaft for allowing said reel shaft to rotate normally and for preventing said reel shaft from rotating at least in a webbing unwinding direction at a time when it is necessary to prevent the reel shaft from rotating;

teeth formed on inside peripheries of said through holes; and stopper members formed on flanges provided on the right and left sides of said webbing winding portion, said stopper members rotatably disposed between an engaging position where they engage with said teeth and a non-engaging position where they are apart from said teeth, said projection being disposed opposite to a portion where one of said stopper members engages with said teeth with respect to a center of said flange where said one of the stopper members is attached.

* * * * *